US012798346B2

(12) United States Patent
Abraham

(10) Patent No.: US 12,798,346 B2
(45) Date of Patent: Nov. 17, 2026

(54) COVER FOR TRANSPARENT ARMAMENT WINDOWS OF A VEHICLE

(71) Applicant: Secure Glass, Inc., University Place, WA (US)

(72) Inventor: Birch Anthony Abraham, University Place, WA (US)

(73) Assignee: Secure Glass, Inc., University Place, WA (US)

( * ) Notice: Subject to any disclaimer, the term of this patent is extended or adjusted under 35 U.S.C. 154(b) by 162 days.

(21) Appl. No.: 18/420,468

(22) Filed: Jan. 23, 2024

(65) Prior Publication Data

US 2025/0206117 A1 Jun. 26, 2025

Related U.S. Application Data

(60) Provisional application No. 63/613,869, filed on Dec. 22, 2023.

(51) Int. Cl.
*B60J 11/08* (2006.01)
*B32B 27/08* (2006.01)
(Continued)

(52) U.S. Cl.
CPC ............... *B60J 11/08* (2013.01); *B32B 27/08* (2013.01); *B32B 27/32* (2013.01); *B32B 27/34* (2013.01);
(Continued)

(58) Field of Classification Search
CPC ..... B60J 11/06; B60J 11/08; B60J 3/00; B60J 3/002; B60J 1/2094; B32B 2250/03;
(Continued)

(56) References Cited

U.S. PATENT DOCUMENTS 2,065,242 A * 12/1936 Omerly, Jr. .............. B60J 11/08 160/354
2,332,158 A * 10/1943 Magill .................. B64C 1/1476 244/121
(Continued)

FOREIGN PATENT DOCUMENTS

CN 1179750 A * 4/1998 ............... F41H 3/00
CN 114787096 A * 7/2022 ............. G02B 5/208
(Continued)

OTHER PUBLICATIONS

Transhield, Inc. 2932 Thorne Drive, Elkhart, IN 46514, (574)742-4333, www.transhield-usa.com, Window Cover Kits shown on website.

*Primary Examiner* — Johnnie A. Shablack
(74) *Attorney, Agent, or Firm* — Shaver Swanson; Scott D. Swanson

(57) ABSTRACT

A cover for a transparent armament window of a vehicle is configured to fit over the transparent armament window such that the cover protects the transparent armament window from environmental damage while further providing tactical advantages to vehicle users. The cover includes a cover front face and upper, lower, right, and left flaps extending respectively from the upper, lower, right, and left sides of the cover front face. The cover front face seats atop the transparent armament window, whereas the upper, lower, right, and left flaps respectively fold over the transparent armament window at the upper, lower, right, and left edges thereof and secure to the vehicle thereby covering the transparent armament window.

58 Claims, 13 Drawing Sheets

(51) Int. Cl.
*B32B 27/32* (2006.01)
*B32B 27/34* (2006.01)
*B60J 3/00* (2006.01)

(52) U.S. Cl.
CPC ....... *B32B 2250/03* (2013.01); *B32B 2250/24* (2013.01); *B32B 2250/40* (2013.01); *B32B 2307/304* (2013.01); *B32B 2307/412* (2013.01); *B32B 2307/558* (2013.01); *B32B 2605/006* (2013.01); *B60J 3/00* (2013.01)

(58) Field of Classification Search
CPC ............ B32B 2250/24; B32B 2250/40; B32B 2307/304; B32B 2307/412; B32B 2307/558; B32B 2605/006
See application file for complete search history.

(56) References Cited

U.S. PATENT DOCUMENTS 2,614,630 A * 10/1952 Moszelt ................... B60J 11/08 160/DIG. 3
2,646,118 A * 7/1953 Berty ....................... B60J 11/08 160/369
3,336,969 A * 8/1967 Marchman ............... B60J 11/08 160/370.21
4,726,406 A * 2/1988 Weatherspoon ......... B60J 11/08 296/136.03
4,867,216 A * 9/1989 McKee .................... B60J 11/00 150/166
4,903,748 A * 2/1990 Foraker .................... B60J 11/08 160/370.21
4,966,405 A * 10/1990 Tremaine ................. B60J 11/08 160/370.21
5,035,460 A * 7/1991 Huang ..................... B60J 11/08 160/370.21
5,037,156 A * 8/1991 Lundberg ................. B60J 11/08 160/370.21
5,123,468 A * 6/1992 Mater, Jr. ................. B60J 11/08 160/370.21
5,267,599 A * 12/1993 Kim ....................... B60J 1/2091 160/DIG. 3
5,275,460 A * 1/1994 Kraus ...................... B60J 11/06 160/DIG. 16
5,324,090 A * 6/1994 Lehnhoff ................. B60J 11/08 160/370.21
5,356,191 A * 10/1994 Sheehan .................. B60J 11/08 160/370.21
5,356,193 A * 10/1994 Palmer, II ................ B60J 11/00 280/770
5,415,214 A * 5/1995 Bock ........................ B60J 11/08 296/136.01
5,547,734 A * 8/1996 Tusch ..................... B32B 5/024 428/920
5,615,923 A * 4/1997 Madison .................. B60J 11/08 160/370.21
5,638,642 A * 6/1997 Nemec ..................... B60J 11/00 296/136.02
5,800,006 A * 9/1998 Pettigrew ................. B60J 11/00 296/136.02
5,816,641 A * 10/1998 Chen ........................ B60J 11/08 150/168
5,975,621 A * 11/1999 Lefevre ...................... B60J 9/00 296/136.07
6,015,180 A * 1/2000 Beuerle .................... B60J 11/08 160/370.21
D443,572 S * 6/2001 Freeman ...................... D12/183
6,276,741 B1 * 8/2001 Campfield ............... B60J 11/08 296/97.7
6,289,968 B1 * 9/2001 Karten ................... B60J 1/2091 160/370.21
6,513,853 B2 * 2/2003 Langley ................... B60J 11/08 160/370.21
6,644,716 B1 * 11/2003 McNabb .................. B60J 11/00 296/136.11
6,648,396 B2 * 11/2003 Monahan ............... B60J 1/2011 160/370.21
6,691,601 B2 * 2/2004 Cohen ....................... F41H 5/08 89/36.01
D496,322 S * 9/2004 Farney ......................... D12/401
7,059,650 B1 * 6/2006 Wood ....................... B60J 11/08 296/97.8
7,255,386 B1 * 8/2007 Perniciaro ................ B60J 11/00 296/136.01
7,431,375 B1 * 10/2008 Julius ....................... B60J 11/06 160/370.21
7,673,924 B1 * 3/2010 Lau ........................... B60J 11/08 296/95.1
D617,259 S * 6/2010 Malina ......................... D12/401
7,823,953 B2 * 11/2010 Haas ........................ B60J 11/08 160/370.21
8,061,761 B1 * 11/2011 Sierra ...................... B60J 11/06 296/136.01
8,088,462 B1 * 1/2012 Cockman ............. F41H 5/0407 160/370.21
8,132,603 B2 * 3/2012 Hogan ..................... B60J 11/08 160/370.21
8,430,445 B1 * 4/2013 Williams ................ B60J 11/08 160/370.21
8,757,240 B1 * 6/2014 Song ........................ B60J 11/08 160/370.21
9,061,575 B2 * 6/2015 Singleton ................ B60J 11/08
9,126,475 B2 * 9/2015 Niyogi ..................... H05B 3/34
9,150,088 B2 * 10/2015 Yang ........................ B60J 11/08
9,205,725 B1 * 12/2015 Yang ........................ B60J 11/08
9,452,667 B2 * 9/2016 Harmon ................... B64D 1/22
9,676,262 B2 * 6/2017 Peries ...................... B60J 11/08
9,688,129 B2 * 6/2017 Mansueto ................ B60J 11/08
10,414,249 B2 * 9/2019 Davila ................... B60J 1/2094
10,759,143 B2 * 9/2020 Shaw ..................... A47C 31/00
10,800,239 B2 * 10/2020 Ingram .................... B60J 11/00
D902,099 S * 11/2020 Abraham ..................... D12/183
10,919,374 B2 * 2/2021 Barnes, Jr. ............... B60J 11/08
11,358,443 B2 * 6/2022 Tosetto .................... B60J 11/08
11,667,179 B2 * 6/2023 Ulcickas ................ B60J 5/0486 296/24.35
D1,063,783 S * 2/2025 Wang ........................... D12/220
D1,090,386 S * 8/2025 Abraham ..................... D12/183
12,552,231 B2 * 2/2026 Scherker ................ B60J 1/2094
2009/0301671 A1 * 12/2009 Locklear .................. B60J 11/08 160/370.21
2010/0200180 A1 * 8/2010 Lien ......................... B60J 11/08 160/370.21
2011/0056634 A1 * 3/2011 Crozier .................... B60J 11/08 160/370.21
2012/0090452 A1 * 4/2012 Sudhakar ............. F41H 5/0457 70/237
2013/0279037 A1 * 10/2013 Wong ..................... G02B 7/182 359/871
2015/0101768 A1 * 4/2015 Lee ........................ B60J 1/2091 160/370.21
2015/0115647 A1 * 4/2015 Niyogi ..................... H05B 3/34 296/136.01
2018/0099551 A1 * 4/2018 Barnes, Jr. ............... B60J 11/08
2018/0334020 A1 * 11/2018 Garnick ................... B60J 11/04
2019/0241048 A1 * 8/2019 Xu ........................... B60J 11/08
2022/0055466 A1 * 2/2022 Sparks ..................... B60J 11/04
2022/0314764 A1 * 10/2022 Prudhomme ............ B60J 11/08
2022/0390211 A1 * 12/2022 Adrain .................... E06B 9/382
2024/0181857 A1 * 6/2024 Black ..................... B60J 1/2094
2024/0308317 A1 * 9/2024 Wang ....................... B60J 11/08
2025/0206117 A1 * 6/2025 Abraham ................ B32B 27/34
2025/0303838 A1 * 10/2025 Lockwood ................ B32B 3/08

FOREIGN PATENT DOCUMENTS

DE 3806810 A1 * 10/1988 .............. B60J 11/08
DE 20212487 U1 * 3/2003 ............. B32B 27/12
DE 202008007538 U1 * 7/2009 .............. B60J 11/08
FR 2681559 A1 * 3/1993 .............. B60J 11/08

(56) References Cited

FOREIGN PATENT DOCUMENTS

| | | | | | |
|---|---|---|---|---|---|
| FR | 2730193 | A1 | * | 8/1996 | .............. B60J 11/08 |
| KR | 19980047277 | U | * | 9/1998 | .............. B60J 1/002 |
| KR | 200141734 | Y1 | * | 4/1999 | .............. B60J 11/06 |
| KR | 20060023834 | A | * | 3/2006 | ......... B29C 44/1276 |
| KR | 20100035586 | A | * | 4/2010 | ............ B60J 3/0204 |
| KR | 20110010081 | U | * | 10/2011 | .............. B60J 3/002 |
| KR | 20120086541 | A | * | 8/2012 | ............. B32B 37/12 |
| KR | 20150001415 | U | * | 4/2015 | .............. B60J 11/08 |
| KR | 200480054 | Y1 | * | 4/2016 | .............. B60J 3/002 |
| KR | 20190006743 | A | * | 1/2019 | .............. B60J 3/002 |
| KR | 20210023526 | A | * | 3/2021 | .............. B60J 11/06 |
| WO | WO-2016151418 | A1 | * | 9/2016 | .............. B60J 11/08 |

* cited by examiner

COVER FOR TRANSPARENT ARMAMENT WINDOWS OF A VEHICLE

BACKGROUND OF THE INVENTION

1. Field of the Invention

The present invention relates generally to protecting transparent armament windows and, more particularly, but not way of limitation, to a cover for a transparent armament window or windows of a vehicle that protects the transparent armament window or windows from damage while further providing tactical advantages to vehicle users, such as, for example, vehicle blackout and glare reduction.

2. Description of the Related Art

Operating in a hostile environment, particularly for military personnel, often requires a vehicle resistant to projectile penetration. Such a projectile resistant vehicle, to maintain its resistance to projectile penetration while still allowing viewing from the vehicle, incorporates transparent armament windows in place of typical glass windows on the basis transparent armament is an optically transparent, projectile penetration resistant material. Although transparent armament windows are critical in a projectile resistant vehicle, a transparent armament window unfortunately is negatively affected by environmental factors that present maintenance difficulties and necessitate special care of the transparent armament window in order to extend its useful life and more importantly to maintain its integrity thereby preventing a catastrophic failure. A transparent armament window exposed to direct sunlight, particularly during vehicle transport and storage or extended use in a fixed operating position, sustains degrading delamination, bubbles, loss of adhesion, clouding, and/or discoloring due to the sunlight, UV rays, and repeated heating and cooling. Moreover, a transparent armament window experiencing a hail storm, blowing sand causing abrasion, or a rock strike, particularly during transport, can suffer useful life diminishing damage. Without damage mitigating care and maintenance, the useful life of a transparent armament window is limited, resulting in an early and costly replacement of the transparent armament window.

Accordingly, a cover for a transparent armament window or windows of a projectile resistant vehicle that protects the transparent armament window or windows from environmental damage while further providing tactical advantages to vehicle users when deployed in a fixed operating position will provide desirable improvements in the area of projectile resistant vehicles.

SUMMARY OF THE INVENTION

In accordance with the present invention, a cover for a transparent armament window of a vehicle includes an outer protective material dimensionally greater than the transparent armament window, a protective backing material dimensionally greater than the transparent armament window, and an insulating material inserted centrally between the outer protective material and the protective backing material. The insulating material is dimensionally similar to the transparent armament window such that insulating material seats atop the transparent armament window whereby the insulating material blocks the transparent armament window to thermal transmissions.

The outer protective material secures with the protective backing material directly adjacent the insulating material thereby sealing the insulating material within the outer protective material and the protective backing material. Securing the outer protective material and the protective backing material with the insulating material therebetween forms a cover front face including a protective cover top secured to a protective backing with the insulating material therebetween. The cover front face, which includes an upper side, a lower side, a right side, and a left side, seats atop the transparent armament window of the vehicle with the upper side of the cover front face adjacent an upper edge of the transparent armament window, the lower side of the cover front face adjacent a lower edge of the transparent armament window, the right side of the cover front face adjacent a right edge of the transparent armament window, the left side of the front face adjacent a left edge of the transparent armament window.

The outer protective material and the protective backing material extending from the upper side of the cover front face secure to form an upper flap including a protective flap top secured to a protective backing. The upper flap pivots relative to the upper side of the cover front face whereby the upper flap folds over the transparent armament window at the upper edge thereof. The upper flap further secures to the vehicle when the upper flap extends over the upper edge of the transparent armament window thereby covering the transparent armament window at the upper edge. The upper flap in order to secure to the vehicle receives therein at least a first magnet whereby, when the upper flap extends over the upper edge of the transparent armament window, the at least a first magnet secures the upper flap to the vehicle. More particularly, an upper pocket formed in the upper flap is configured to receive therein the at least a first magnet.

The outer protective material and the protective backing material extending from the lower side of the cover front face secure to form a lower flap including a protective flap top secured to a protective backing. The lower flap pivots relative to the lower side of the cover front face whereby the lower flap folds over the transparent armament window at the lower edge thereof. The lower flap further secures to the vehicle when the lower flap extends over the lower edge of the transparent armament window thereby covering the transparent armament window at the lower edge. The lower flap in order to secure to the vehicle receives therein at least a first magnet whereby, when the lower flap extends over the lower edge of the transparent armament window, the at least a first magnet secures the lower flap to the vehicle. More particularly, a lower pocket formed in the lower flap is configured to receive therein the at least a first magnet.

The outer protective material and the protective backing material extending from the right side of the cover front face secure to form a right flap including a protective flap top secured to a protective backing. The right flap pivots relative to the right side of the cover front face whereby the right flap folds over the transparent armament window at the right edge thereof. The right flap further secures to the vehicle when the right flap extends over the right edge of the transparent armament window thereby covering the transparent armament window at the right edge. The right flap in order to secure to the vehicle receives therein at least a first magnet whereby, when the right flap extends over the right edge of the transparent armament window, the at least a first magnet secures the right flap to the vehicle. More particularly, a right pocket formed in the right flap is configured to receive therein the at least a first magnet.

The outer protective material and the protective backing material extending from the left side of the cover front face secure to form a left flap including a protective flap top secured to a protective backing. The left flap pivots relative to the left side of the cover front face whereby the left flap folds over the transparent armament window at the left edge thereof. The left flap further secures to the vehicle when the left flap extends over the left edge of the transparent armament window thereby covering the transparent armament window at the left edge. The left flap in order to secure to the vehicle receives therein at least a first magnet, whereby, when the left flap extends over the left edge of the transparent armament window, the at least a first magnet secures the left flap to the vehicle. More particularly, a left pocket formed in the left flap is configured to receive therein the at least a first magnet.

The cover includes the cover front face with the insulating material that seats atop the transparent armament window and the upper, lower, right, and left flaps that fold respectively over the upper, lower, right, and left edges of the transparent armament window to block visible light signatures from interior of the vehicle. Moreover, the insulating material within the cover front face comprises a radiant barrier that blocks thermal signatures from interior of the vehicle thereby preventing viewing into the interior of the vehicle from exterior of the vehicle using a thermal imaging device. In addition, the upper, lower, right, and left flaps respectively folding over the upper, lower, right, and left edges of the transparent armament window assists in blocking thermal signatures from interior of the vehicle. The upper, lower, right, and left flaps may include therein an insulating material such that folding of the upper, lower, right, and left flaps respectively over the upper, lower, right, and left edges of the transparent armament window blocks thermal signatures from interior of the vehicle. The insulating material within the cover front face further provides padding that protects the transparent armament window from strikes and abrasions caused by natural materials. The cover in order to affix more firmly to the vehicle includes an anchor tab secured with the cover front face at each corner thereof configured to engage with a tie down securable to the vehicle.

The cover front face may include an opening therethrough that allows the cover to fit over a platform extending from the vehicle in a location that places the platform over the transparent armament window. The cover when the cover front face includes the opening therethrough includes a screen secured to the cover adjacent the opening whereby the screen is sized to seat over and close the opening. A magnet inserted into the screen, when the screen is lifted from the opening, maintains the screen lifted from the opening through contact with the vehicle. In addition, a magnet located within the cover front face in alignment with the magnet of the screen, when the screen is closed over the opening, works with the magnet of the screen to maintain the screen closed over the opening. The screen may include therein an insulating material.

The cover when used over a first transparent armament window and a second transparent armament window fits on the first and second transparent armament windows as follows. The cover front face seats atop the first and second transparent armament windows of the vehicle with the upper side of the cover front face adjacent an upper edge of the first and second transparent armament windows, the lower side of the cover front face adjacent a lower edge of the first and second transparent armament windows, the right side of the cover front face adjacent a right edge of the first transparent armament window, the left side of the front face adjacent a left edge of the second transparent armament window. The upper flap folds over the first and second transparent armament windows at the upper edges thereof and then secures to the vehicle. The lower flap folds over the first and second transparent armament windows at the lower edges thereof and then secures to the vehicle. The right flap folds over the first transparent armament window at the right edge thereof and then secures to the vehicle. The left flap folds over the second transparent armament window at the left edge thereof and then secures to the vehicle.

The cover may include a guide centrally located in the cover front face adjacent the lower side thereof. The guide includes dimensions whereby the guide spans a gap between the first transparent armament window and the second transparent armament window. In accordance therewith, placement of the cover atop the first and second transparent armament windows with the guide therebetween ensures the insulating material of the cover seats atop both the first and second transparent armament windows.

The lower flap in order to facilitate fitting of the cover over the first and second transparent armament windows receives therein a first weighted magnet and a second weighted magnet that secure the lower flap to the vehicle when the lower flap extends over the lower edges of the first and second transparent armament windows. The lower pocket in the lower flap is configured to receive therein the first and second weighted magnets.

The lower flap includes a gap that divides the lower flap into a first flap section and a second flap section pivotable relative to the lower side of the cover front face. The first lower flap section, which receives therein the first weighted magnet, folds over the first transparent armament window at the lower edge thereof and then secures to the vehicle using the first weighted magnet thereby covering the first transparent armament window at the lower edge. A first lower pocket section formed in the first lower flap section is configured to receive therein the first weighted magnet. The second lower flap section, which receives therein the second weighted magnet, folds over the second transparent armament window at the lower edge thereof and then secures to the vehicle using the second weighted magnet thereby covering the second transparent armament window at the lower edge. A second lower pocket section formed in the second lower flap section is configured to receive therein the second weighted magnet.

It is therefore an object of the present invention to provide a cover for a transparent armament window or windows of a vehicle configured to fit over the transparent armament window or windows such that the cover protects the transparent armament window or windows from environmental damage.

It is another object of the present invention to provide a cover for a transparent armament window or windows of a vehicle that imparts tactical advantages to vehicle users.

Still other objects, features, and advantages of the present invention will become evident to those of ordinary skill in the art in light of the following. Also, it should be understood that the scope of this invention is intended to be broad, and any combination of any subset of the features, elements, or steps described herein is part of the intended scope of the invention.

DETAILED DESCRIPTION OF THE PREFERRED EMBODIMENTS

Figure 1:
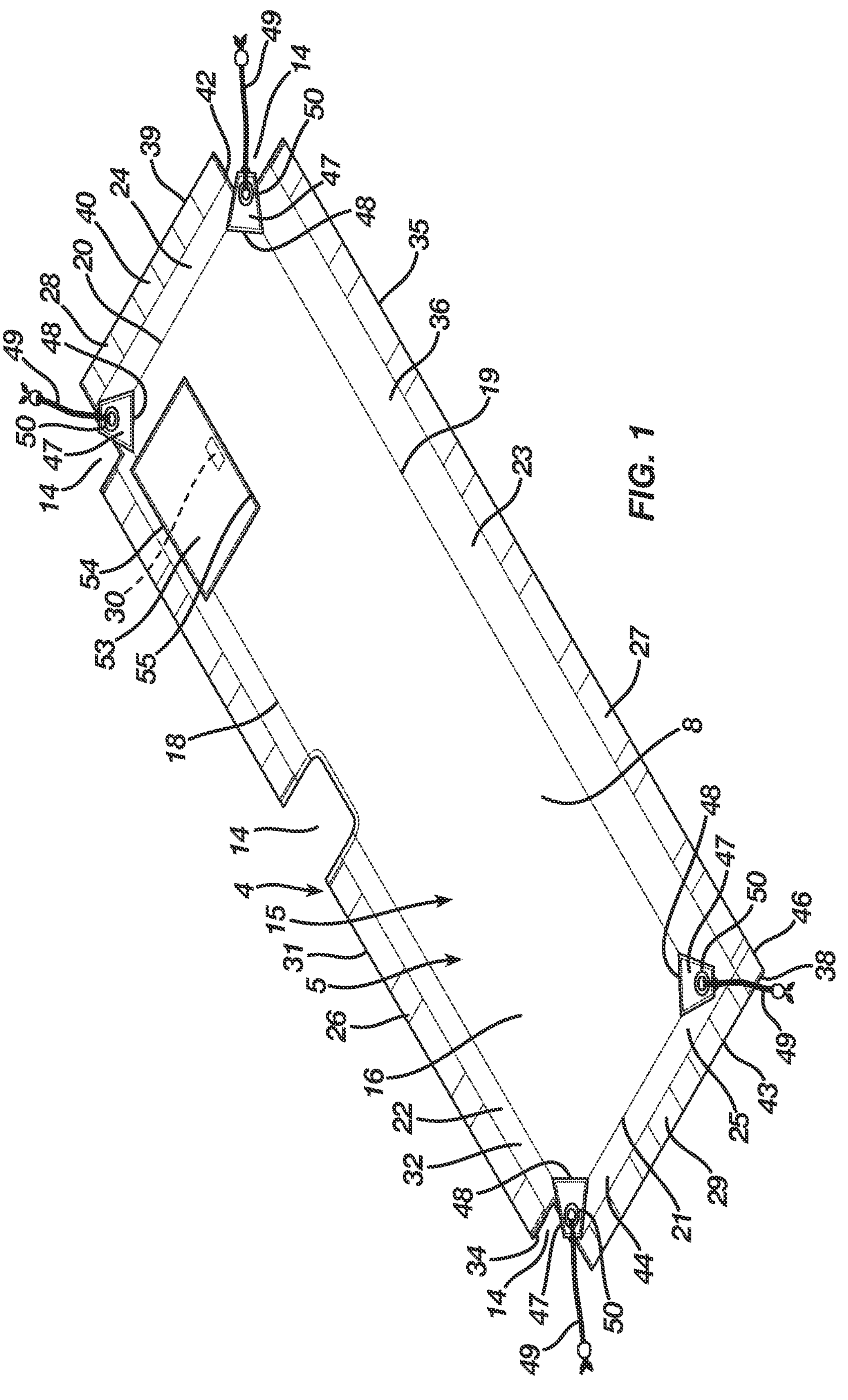
FIG. 1 is a front perspective view illustrating a cover for a transparent armament window of a vehicle according to a first embodiment.
Figure 2:
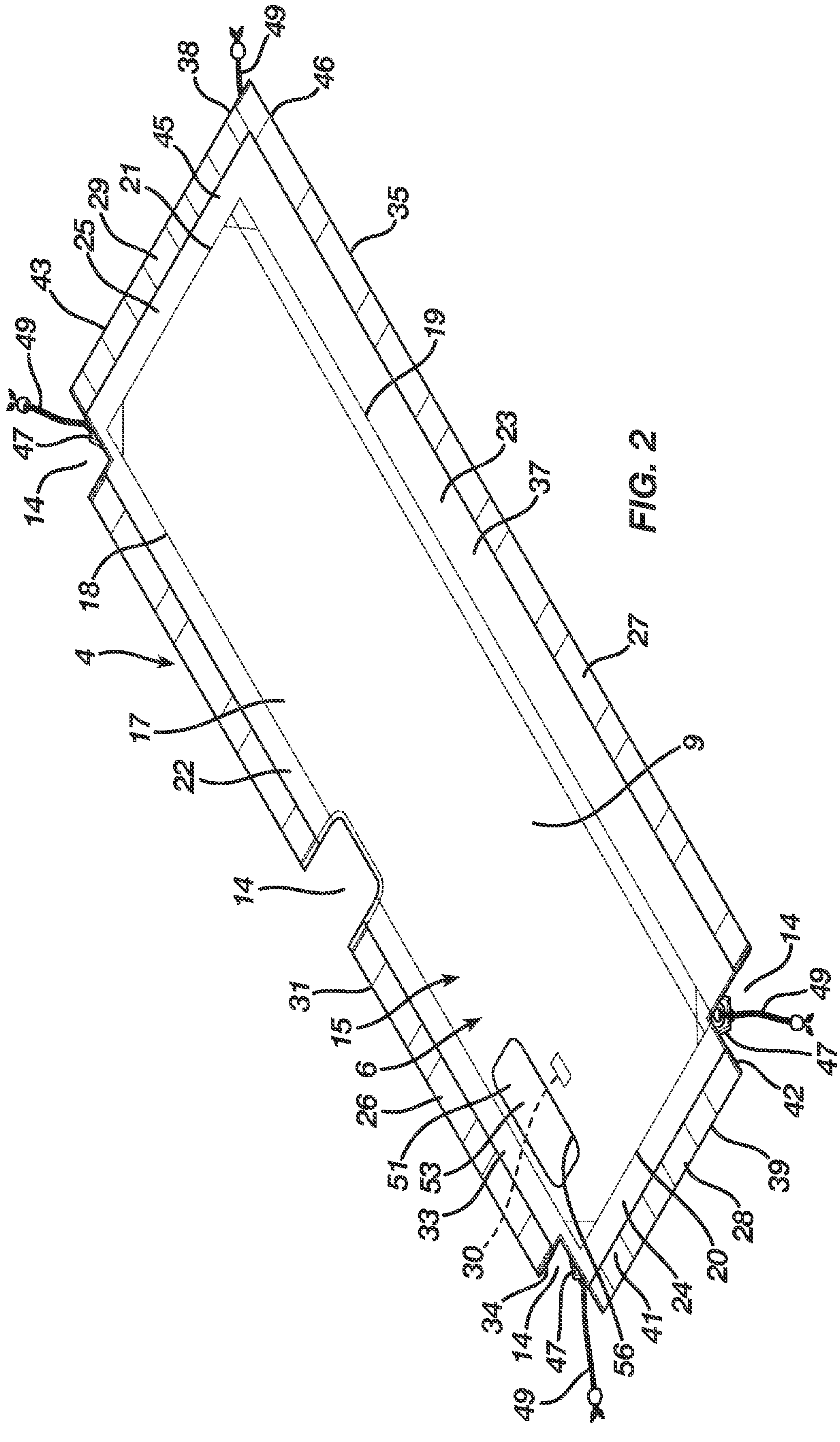
FIG. 2 is a rear perspective view illustrating the cover for a transparent armament window of a vehicle according to the first embodiment.
Figure 3:
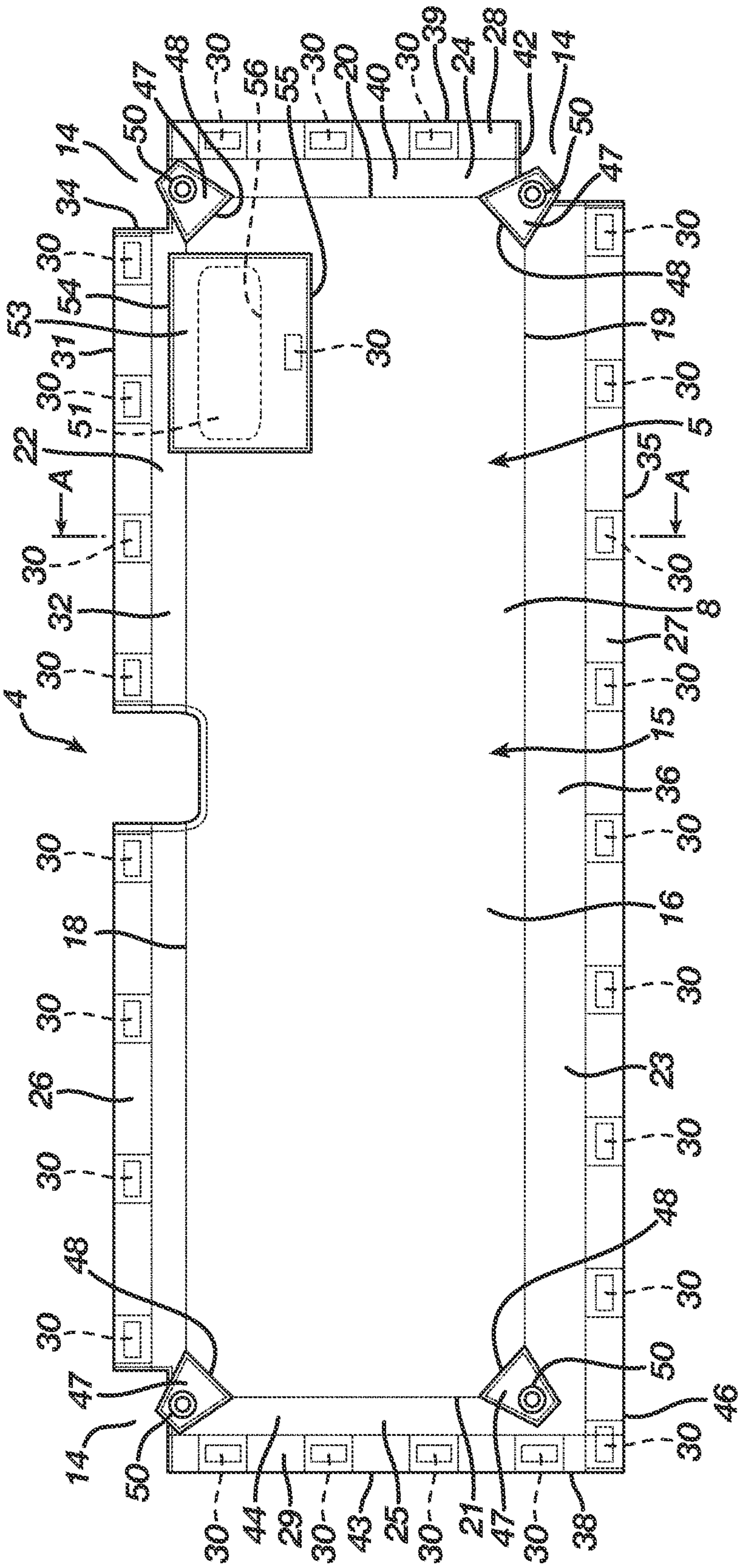
FIG. 3 is a front view illustrating the cover for a transparent armament window of a vehicle according to the first embodiment.
Figure 4:
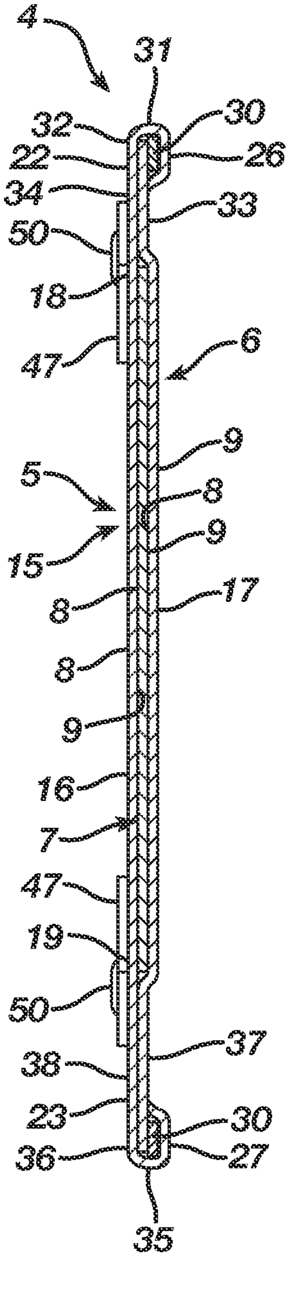
FIG. 4 is a cross-sectional view taken along lines A-A of FIG. 3 illustrating the cover for a transparent armament window of a vehicle according to the first embodiment.
Figure 5:
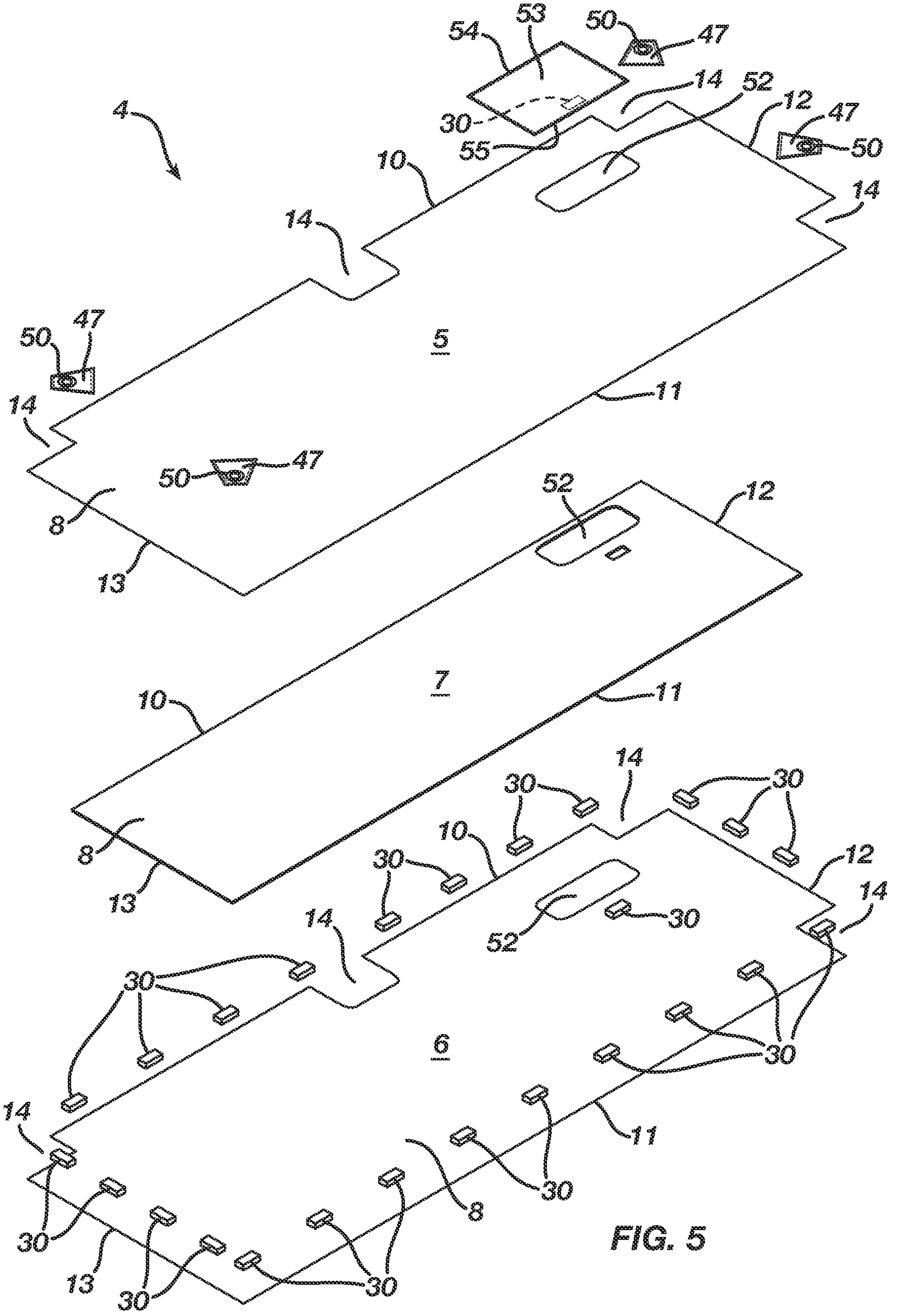
FIG. 5 is an exploded perspective view illustrating the cover for a transparent armament window of a vehicle according to the first embodiment.
Figure 6:
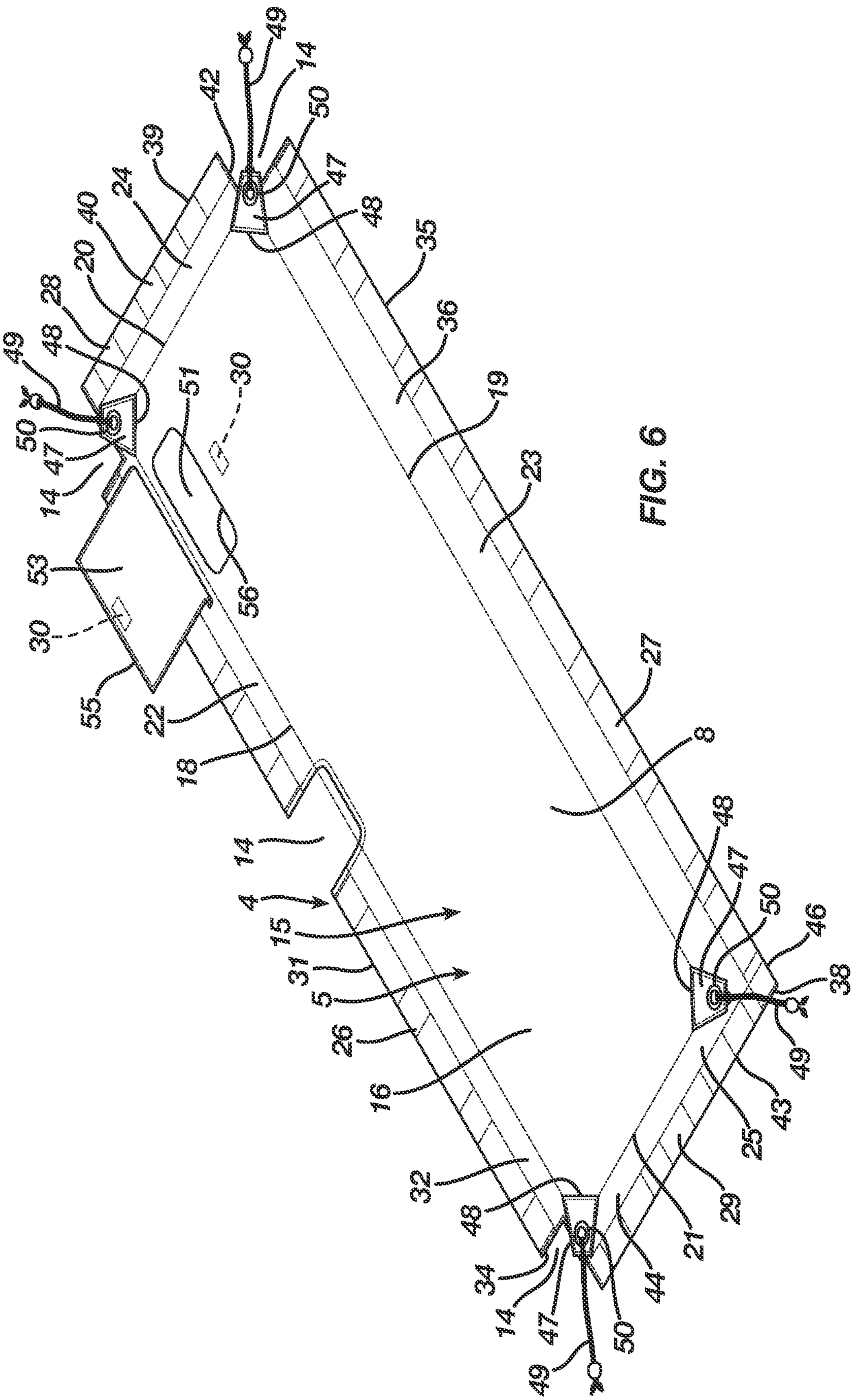
FIG. 6 is a front perspective view illustrating the cover for a transparent armament window of a vehicle according to a first embodiment.

As required, detailed embodiments of the present invention are disclosed herein; however, it is to be understood that the disclosed embodiments are merely exemplary of the invention, which may be embodied in various forms. Figures are not necessarily to scale, and some features may be exaggerated to show details of particular components or steps.

As illustrated in FIGS. 1-6, a cover 4 according to a first embodiment is configured to fit over and cover a transparent armament window of a vehicle, and, more particularly, but not by way of limitation, to fit over and cover a front transparent armament window of the vehicle. The cover 4 according to the first embodiment includes a sheet of outer protective material 5, a sheet of protective backing material 6, and a sheet of insulating material 7 for insertion between the sheet of outer protective material 5 and the sheet of protective backing material 6. The outer protective material 5 and the protective backing material 6 in the first embodiment are a durable nylon material suitable for use outdoors, such as, for example, a textured nylon Codura® available from Seattle Textile Company, 3434 $2^{nd}$ Avenue South, Seattle, WA 98134 (seatex.com). The insulating material 7 in the first embodiment is a radiant barrier insulation selected to provide a radiant barrier that prevents thermal transmissions and thus repeated heating and cooling of the transparent armament window, such as, for example, a reflective single or double bubble foil/foil RFID radiant barrier insulation or a reflective single or double bubble polyethylene/foil RFID radiant barrier insulation available from Innovative Insulation Solutions, 6200 W. Pioneer Parkway, Arlington, TX 76013 (radiantbarrier.com).

The outer protective material 5, the protective backing material 6, and the insulating material 7 in the first embodiment are rectangular with a front surface 8, a rear surface 9, an upper side 10, a lower side 11, a right side 12, and a left side 13 although one of ordinary skill in the art will recognize the shape of the outer protective material 5, the protective backing material 6, and the insulating material 7 is determined by the shape of the transparent armament window. The outer protective material 5 and the protective backing material 6 in the first embodiment are dimensionally greater than the transparent armament window in order to allow the cover 4 to extend over the transparent armament window. The outer protective material 5 in the first embodiment is dimensionally greater than the protective backing material 6 such that the outer protective material 5 facilitates closure and thus sealing of the cover 4 at the edges thereof. Alternatively, the outer protective material 5 and the protective backing material 6 may be dimensionally identical whereby a nylon material batting secured about the edges of the outer protective material 5 and the protective backing material 6 closes and thus seals the cover 4. The insulating material 7 in the first embodiment is dimensionally identical to the transparent armament window or minimally greater dimensionally whereby the insulating material 7 seats entirely atop the transparent armament window thereby substantially, completely blocking the transparent armament window to thermal transmissions. The outer protective material 5 and the protective backing material 6 in the first embodiment at the top center, top right corner, bottom right corner, and top left corner include a cut-out section 14 that permits the cover 4 to fit around a window frame for the transparent armament window during seating of the cover 4 atop the transparent armament window. Nevertheless, one of ordinary skill in the art will recognize that the outer protective material 5 and the protective backing material 6 may comprise any number of cut-out sections 14 including none as determined by the window frame for the transparent armament window.

When forming the cover 4 from the outer protective material 5, the protective backing material 6, and the insulating material 7, the outer protective material 5 at its rear surface 9 is placed atop the protective backing material 6 at its front surface 8 with the insulating material 7 centered between the outer protective material 5 and the protective backing material 6. The outer protective material 5 secures with the protective backing material 6 directly adjacent the insulating material 7 in order to seal the insulating material 7 within the outer protective material 5 and the protective backing material 6. The outer protective material 5 secures with the protective backing material 6 using any suitable securing means, such as, for example, sewing or an adhesive. The securing of the outer protective material 5 and the protective backing material 6 about the insulating material 7 creates a cover front face 15 comprising a protective cover top 16 secured to a protective backing 17 with the insulating material 7 therebetween. The cover front face 15 includes an upper side 18, a lower side 19, a right side 20, and a left side 21. The cover front face 15, due to the sizing and shape of the insulating material 7, is configured to seat atop the transparent armament window with the upper side 18 of the cover front face 15 adjacent or minimally over an upper edge of the transparent armament window, the lower side 19 of the cover front face 16 adjacent or minimally over a lower edge of the transparent armament window, the right side 20 of the cover front face 15 adjacent or minimally over a right edge of the transparent armament window, the left side 21 of the front face 15 adjacent or minimally over a left edge of the transparent armament window.

After creating the cover front face 15, the outer protective material 5 and the protective backing material 6 in the first embodiment being dimensionally greater than the insulating material 7 allows the formation of an upper flap 22, a lower flap 23, a right flap 24, and a left flap 25. Moreover, the outer protective material 5 in the first embodiment being dimensionally greater than the protective backing material 6 or the use of a nylon material batting allows the formation of an upper pocket 26 in the upper flap 22, a lower pocket 27 in the lower flap 23, a right pocket 28 in the right flap 24, and a left pocket 29 in the left flap 25.

Formation of the upper flap 22 and the upper pocket 26 includes at least one magnet 30 and preferably multiple magnets 30 being placed on the rear surface 9 of the protective backing material 6 adjacent its upper side 10. After placement of the magnets 30, the outer protective material 5 at its upper side 10 is folded over the protective backing material 6 at its upper side 10 until the outer protective material 5 at its upper side 10 overlays the magnets 30. The outer protective material 5 then secures with the protective backing material 6 using any suitable securing means, such as, for example, sewing or an adhesive. The securing of the outer protective material 5 with the protective backing material 6 seals the upper flap 22 and thus the cover 4 while further creating the upper pocket 26 including the magnets 30 therein. The outer protective material 5 additionally secures with the protective backing material 6 about each of the magnets 30 in order to affix the magnets 30 within the upper pocket 26. It should be understood by one of ordinary skill in the art that the upper flap 22 may be formed without insulating material 7 or alternatively insulating material 7 may be placed between the outer protective material 5 at its rear surface 9 and the protective backing material 6 at its front surface 9 including an appropriate securing of the outer protective material 5 with the protective backing material 6 that seals the insulating material 7 within the upper flap 22.

In the alternative, a nylon material batting fits over the outer protective material 5 and the protective backing material 6 at their upper sides 10 until the nylon material batting overlays the magnets 30. The securing of the nylon material batting to the outer protective material 5 and the protective backing material 6 seals the upper flap 22 and thus the cover 4 while further creating the upper pocket 26 including the magnets 30 therein. The nylon material batting additionally secures with the protective backing material 6 at its rear surface 9 about each of the magnets 30 in order to affix the magnets 30 within the upper pocket 26. The nylon material batting secures with the outer protective material 5 and the protective backing material 6 using any suitable securing means, such as, for example, sewing or an adhesive.

Upon creation of the upper flap 22, the upper flap 22 extends from the upper side 18 of the cover front face 15 to an edge 31 thereof while comprising a protective flap top 32 secured to a protective backing 33 including the upper pocket 26 at the protective backing 33 adjacent the edge 31. The upper flap 22 is configured, particularly with respect to a distance 34 the upper flap 22 extends from the cover front face 15, to pivot and thus fold relative to the upper side 18 of the cover front face 15 such that the upper flap 22 extends and if necessary folds over the transparent armament window at the upper edge thereof until the upper flap 22 at the upper pocket 26 thereof contacts the vehicle, such as, for example, at the window frame for the transparent armament window. The magnets 30, once the upper flap 22 at the upper pocket 26 contacts the vehicle, engage the vehicle thereby holding and thus sealing the cover 4 over the transparent armament window. The magnets 30 in the first embodiment are any magnets suitable to engage a vehicle or vehicle window frame, such as, for example, ceramic ferrite magnets.

Formation of the lower flap 23 and the lower pocket 27 includes at least one magnet 30 and preferably multiple magnets 30 being placed on the rear surface 9 of the protective backing material 6 adjacent its lower side 11. After placement of the magnets 30, the outer protective material 5 at its lower side 11 is folded over the protective backing material 6 at its lower side 11 until the outer protective material 5 at its lower side 11 overlays the magnets 30. The outer protective material 5 then secures with the protective backing material 6 using any suitable securing means, such as, for example, sewing or an adhesive. The securing of the outer protective material 5 with the protective backing material 6 seals the lower flap 23 and thus the cover 4 while further creating the lower pocket 27 including the magnets 30 therein. The outer protective material 5 additionally secures with the protective backing material 6 about each of the magnets 30 in order to affix the magnets 30 within the lower pocket 27. It should be understood by one of ordinary skill in the art that the lower flap 23 may be formed without insulating material 7 or alternatively insulating material 7 may be placed between the outer protective material 5 at its rear surface 9 and the protective backing material 6 at its front surface 9 including an appropriate securing of the outer protective material 5 with the protective backing material 6 that seals the insulating material 7 within the lower flap 23.

In the alternative, a nylon material batting fits over the outer protective material 5 and the protective backing material 6 at their lower sides 11 until the nylon material batting overlays the magnets 30. The securing of the nylon material batting to the outer protective material 5 and the protective backing material 6 seals the lower flap 23 and thus the cover 4 while further creating the lower pocket 27 including the magnets 30 therein. The nylon material batting additionally secures with the protective backing material 6 at its rear surface 9 about each of the magnets 30 in order to affix the magnets 30 within the lower pocket 27. The nylon material batting secures with the outer protective material 5 and the protective backing material 6 using any suitable securing means, such as, for example, sewing or an adhesive.

Upon creation of the lower flap 23, the lower flap 23 extends from the lower side 19 of the cover front face 15 to an edge 35 thereof while comprising a protective flap top 36 secured to a protective backing 37 including the lower pocket 27 at the protective backing 37 adjacent the edge 35. The lower flap 23 is configured, particularly with respect to a distance 38 the lower flap 23 extends from the cover front face 15, to pivot and thus fold relative to the lower side 19 of the cover front face 15 such that the lower flap 23 extends and if necessary folds over the transparent armament window at the lower edge thereof until the lower flap 23 at the lower pocket 27 thereof contacts the vehicle, such as, for example, at the window frame for the transparent armament window. The magnets 30, once the lower flap 23 at the lower pocket 27 contacts the vehicle, engage the vehicle thereby holding and thus sealing the cover 4 over the transparent armament window.

Formation of the right flap 24 and the right pocket 28 includes at least one magnet 30 and preferably multiple magnets 30 being placed on the rear surface 9 of the protective backing material 6 adjacent its right side 12. After placement of the magnets 30, the outer protective material 5 at its right side 12 is folded over the protective backing material 6 at its right side 12 until the outer protective material 5 at its right side 12 overlays the magnets 30. The outer protective material 5 then secures with the protective backing material 6 using any suitable securing means, such as, for example, sewing or an adhesive. The securing of the outer protective material 5 with the protective backing material 6 seals the right flap 24 and thus the cover 4 while further creating the right pocket 28 including the magnets 30 therein. The outer protective material 5 additionally secures with the protective backing material 6 about each of the magnets 30 in order to affix the magnets 30 within the right pocket 28. It should be understood by one of ordinary skill in the art that the right flap 24 may be formed without insulating material 7 or alternatively insulating material 7 may be placed between the outer protective material 5 at its rear surface 9 and the protective backing material 6 at its front surface 9 including an appropriate securing of the outer protective material 5 with the protective backing material 6 that seals the insulating material 7 within the right flap 24.

In the alternative, a nylon material batting fits over the outer protective material 5 and the protective backing material 6 at their right sides 12 until the nylon material batting overlays the magnets 30. The securing of the nylon material batting to the outer protective material 5 and the protective backing material 6 seals the right flap 24 and thus the cover 4 while further creating the right pocket 28 including the magnets 30 therein. The nylon material batting additionally secures with the protective backing material 6 at its rear surface 9 about each of the magnets 30 in order to affix the magnets 30 within the right pocket 28. The nylon material batting secures with the outer protective material 5 and the protective backing material 6 using any suitable securing means, such as, for example, sewing or an adhesive.

Upon creation of the right flap 24, the right flap 24 extends from the right side 20 of the cover front face 15 to an edge 39 thereof while comprising a protective flap top 40 secured to a protective backing 41 including the right pocket 28 at the protective backing 41 adjacent the edge 39. The right flap 24 is configured, particularly with respect to a distance 42 the right flap 24 extends from the cover front face 15, to pivot and thus fold relative to the right side 20 of the cover front face 15 such that the right flap 24 extends and if necessary folds over the transparent armament window at the right edge thereof until the right flap 24 at the right pocket 28 thereof contacts the vehicle, such as, for example, at the window frame for the transparent armament window. The magnets 30, once the right flap 24 at the right pocket 28 contacts the vehicle, engage the vehicle thereby holding and thus sealing the cover 4 over the transparent armament window.

Formation of the left flap 25 and the left pocket 29 includes at least one magnet 30 and preferably multiple magnets 30 being placed on the rear surface 9 of the protective backing material 6 adjacent its left side 13. After placement of the magnets 30, the outer protective material 5 at its left side 13 is folded over the protective backing material 6 at its left side 13 until the outer protective material 5 at its left side 13 overlays the magnets 30. The outer protective material 5 then secures with the protective backing material 6 using any suitable securing means, such as, for example, sewing or an adhesive. The securing of the outer protective material 5 with the protective backing material 6 seals the left flap 25 and thus the cover 4 while further creating the left pocket 29 including the magnets 30 therein. The outer protective material 5 additionally secures with the protective backing material 6 about each of the magnets 30 in order to affix the magnets 30 within the left pocket 29. It should be understood by one of ordinary skill in the art that the left flap 25 may be formed without insulating material 7 or alternatively insulating material 7 may be placed between the outer protective material 5 at its rear surface 9 and the protective backing material 6 at its front surface 9 including an appropriate securing of the outer protective material 5 with the protective backing material 6 that seals the insulating material 7 within the left flap 25.

In the alternative, a nylon material batting fits over the outer protective material 5 and the protective backing material 6 at their left sides 13 until the nylon material batting overlays the magnets 30. The securing of the nylon material batting to the outer protective material 5 and the protective backing material 6 seals the left flap 25 and thus the cover 4 while further creating the left pocket 29 including the magnets 30 therein. The nylon material batting additionally secures with the protective backing material 6 at its rear surface 9 about each of the magnets 30 in order to affix the magnets 30 within the left pocket 29. The nylon material batting secures with the outer protective material 5 and the protective backing material 6 using any suitable securing means, such as, for example, sewing or an adhesive.

Upon creation of the left flap 25, the left flap 25 extends from the left side 21 of the cover front face 15 to an edge 43 thereof while comprising a protective flap top 44 secured to a protective backing 45 including the left pocket 29 at the protective backing 45 adjacent the edge 43. The left flap 25 is configured, particularly with respect to a distance 46 the left flap 25 extends from the cover front face 15, to pivot and thus fold relative to the left side 21 of the cover front face 15 such that the left flap 25 extends and if necessary folds over the transparent armament window at the left edge thereof until the left flap 25 at the left pocket 29 thereof contacts the vehicle, such as, for example, at the window frame for the transparent armament window. The magnets 30, once the left flap 25 at the left pocket 29 contacts the vehicle, engage the vehicle thereby holding and thus sealing the cover 4 over the transparent armament window. Although the lower flap 23 and the left flap 25 in the first embodiment interface such that the lower and left flaps 23 and 25 move as a unit when extending over the transparent armament window, one of ordinary skill in the art will recognize that the cover 4 may include a cut-out at the lower left corner thereof that separates the lower flap 23 from the left flap 25.

The engagement of the upper, lower, right, and left flaps 22, 23, 24, and 25 via the magnets 30 with the vehicle, such as, for example, at the window frame for the transparent armament window, secures the cover 4 over the transparent armament window while allowing a quick removal of the cover 4 from the transparent armament window in the event the vehicle must be quickly relocated. Nevertheless, in instances of vehicle transport, long term vehicle storage, or simply a high wind situation, it is desirable to affix the cover 4 more firmly with the vehicle. In accordance therewith, the cover 4 includes an anchor tab 47 secured with the cover front face 15 at the corners 48 thereof and more particularly with the protective cover top 16 of the cover front face 15. The anchor tabs 47 secure with the cover front face 15 at the corners 48 using any suitable securing means, such as, for example, sewing or an adhesive. The anchor tabs 47 in the first embodiment are configured to engage with a tie down 49 securable to the vehicle, such as, for example, the illustrated bungee cord type tie downs. More particularly, the anchor tabs 47 in the first embodiment are each provided with an aperture 50 formed by a grommet incorporated into the anchor tab 47 that is engageable with a tie down 49. Once the cover 4 is secured with the vehicle using the anchor tabs 47 and the tie downs 49, the cover 4 will remain affixed over the transparent armament window during vehicle transport, long term vehicle storage, a high wind situation, and the like.

Certain vehicles incorporating transparent armament windows include a platform extending from the vehicle in a location that places the platform over a transparent armament window, typically a front transparent armament window. The platform provides a support for vehicle equipment, such as, for example, communications gear. In the first embodiment, the cover 4, in order to fit over the platform including any vehicle equipment, includes an opening 51 through the cover front face 15 adjacent an upper right corner 48 that traverses the protective cover top 16, the protective backing 17, and the insulating material 7 forming the cover front face 15. The opening 51 in the first embodiment is formed from cut-outs 52 in the outer protective material 5, the protective backing material 6, and the insulating material 7 sealed at the edges thereof using any suitable securing means, such as, for example, sewing or an adhesive.

In the event the vehicle with transparent armament windows does not include a platform, the cover 4 includes a screen 53 secured at an upper side 54 to the upper flap 22 above the opening 51 whereby the screen 53 is sized to seat over and thus close the opening 51. The screen 53 in the first embodiment is formed from a piece of the outer protective material 5 secured over a piece of the protective backing material 6 whereby the pieces of the outer protective material 5 and the protective backing material 6 are sealed at the edges thereof using any suitable securing means, such as, for example, sewing or an adhesive. The screen 53 may include a piece of insulating material 7 inserted between the pieces of the outer protective material 5 and the protective backing material 6. The screen 53 in order to remain lifted from the opening 51 or closed over the opening 51 includes a magnet 30 inserted into the screen 53 adjacent a lower side 55 of the screen 53. The magnet 30 is secured in place during formation of the screen 53 using any suitable securing means, such as, for example, sewing or an adhesive. The magnet 30 inserted into the screen 53 maintains the screen 53 lifted from the opening 51 through contact with the vehicle, such as, for example, at the window frame for the transparent armament window or the platform. Moreover, a magnet 30 located on the rear surface 9 of the protective backing material 6 adjacent a lower side 56 of the opening 51 and in alignment with the magnet 30 of the screen 53 works with the magnet 30 of the screen 53 to maintain the screen 53 closed over the opening 51. The magnet 30 is secured in place during formation of the cover front face 15 using any suitable securing means, such as, for example, sewing or an adhesive.

Figure 7:
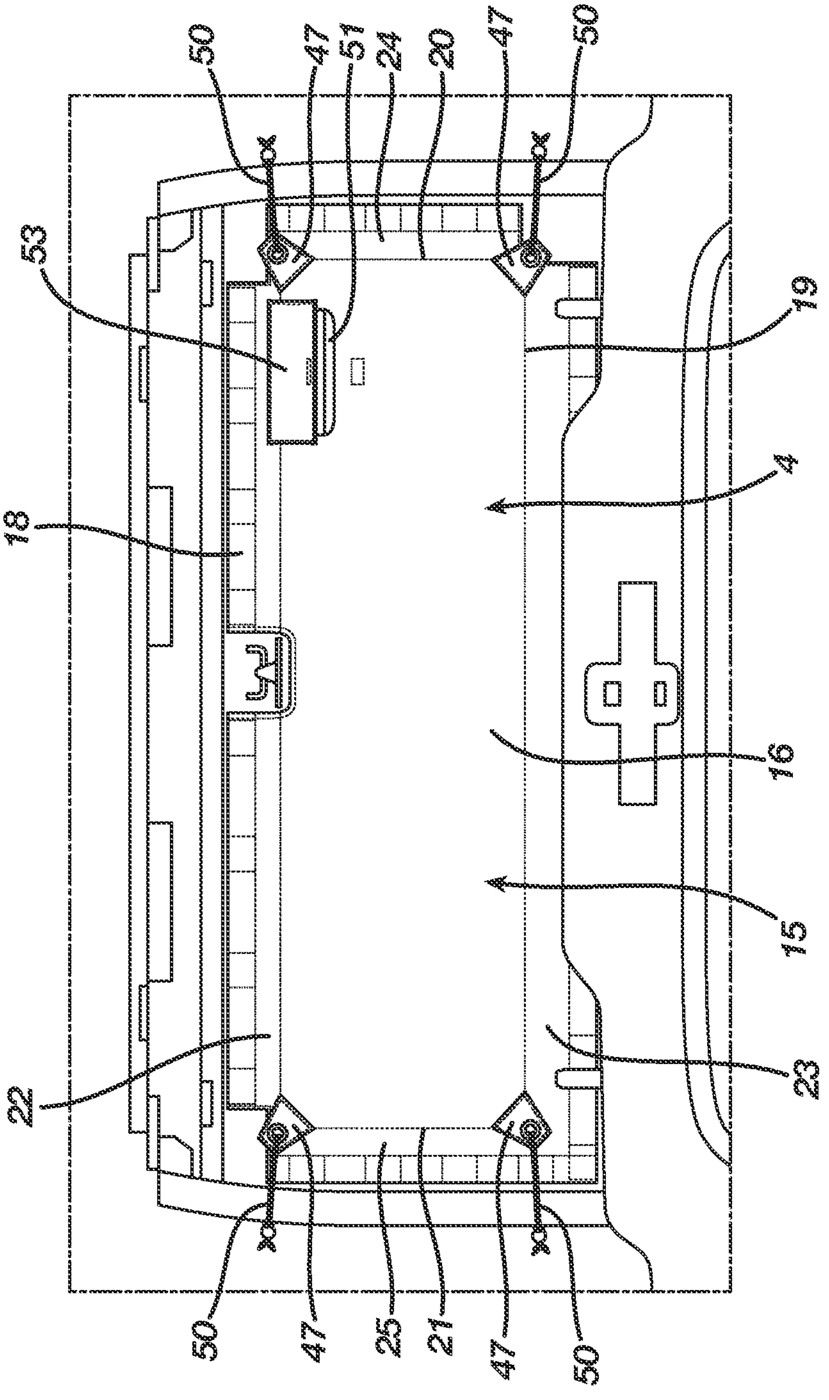
FIG. 7 is a front perspective view illustrating the cover according to the first embodiment placed atop a transparent armament window of a vehicle.
Figure 8:
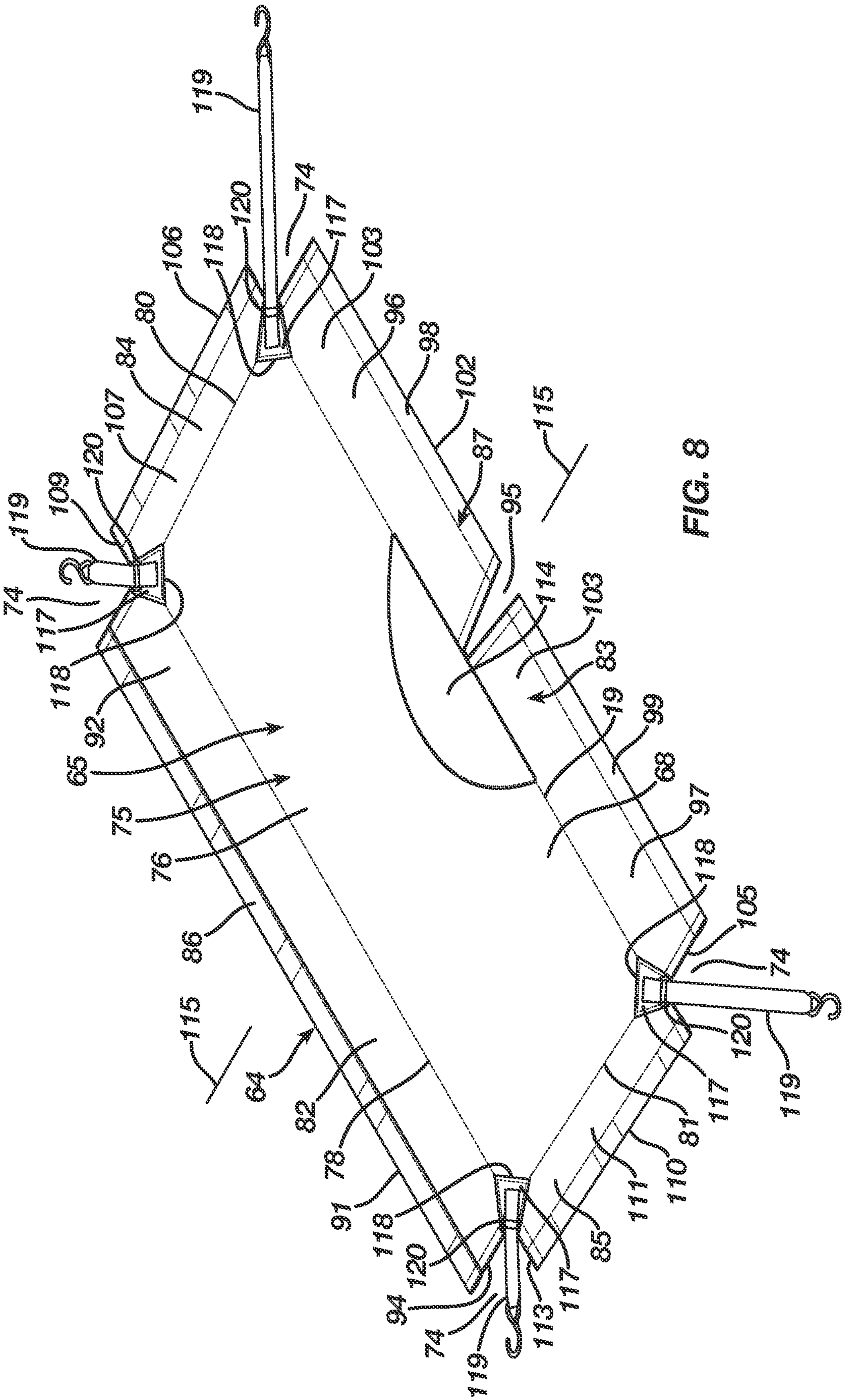
FIG. 8 is a front perspective view illustrating a cover for a transparent armament window of a vehicle according to a second embodiment.
Figure 9:
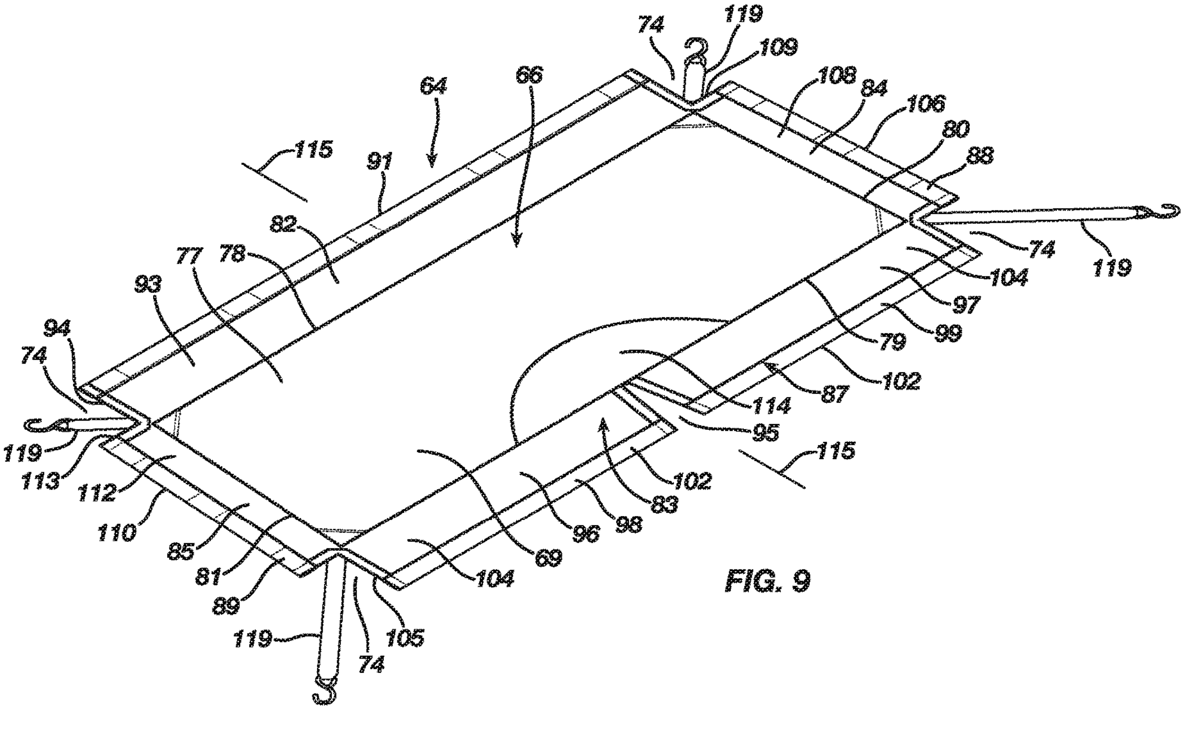
FIG. 9 is a rear perspective view illustrating the cover for a transparent armament window of a vehicle according to the second embodiment.
Figure 10:
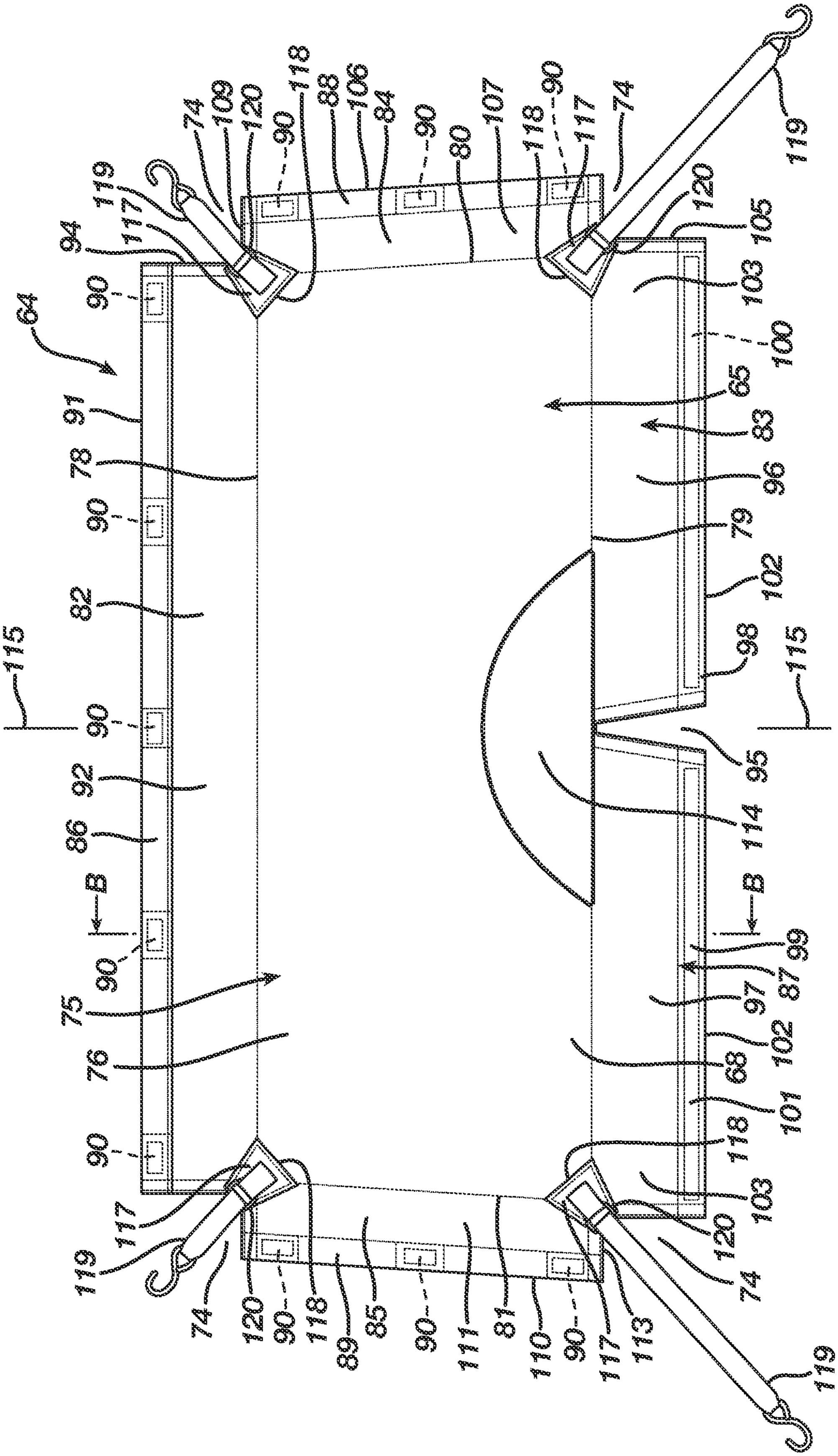
FIG. 10 is a front view illustrating the cover for a transparent armament window of a vehicle according to the second embodiment.
Figure 11:
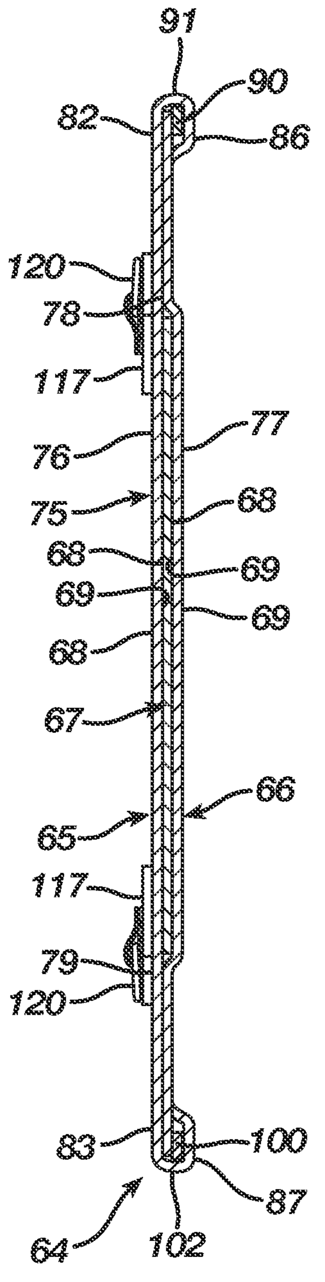
FIG. 11 is a cross-sectional view taken along lines B-B of FIG. 10 illustrating the cover for a transparent armament window of a vehicle according to the second embodiment.
Figure 12:
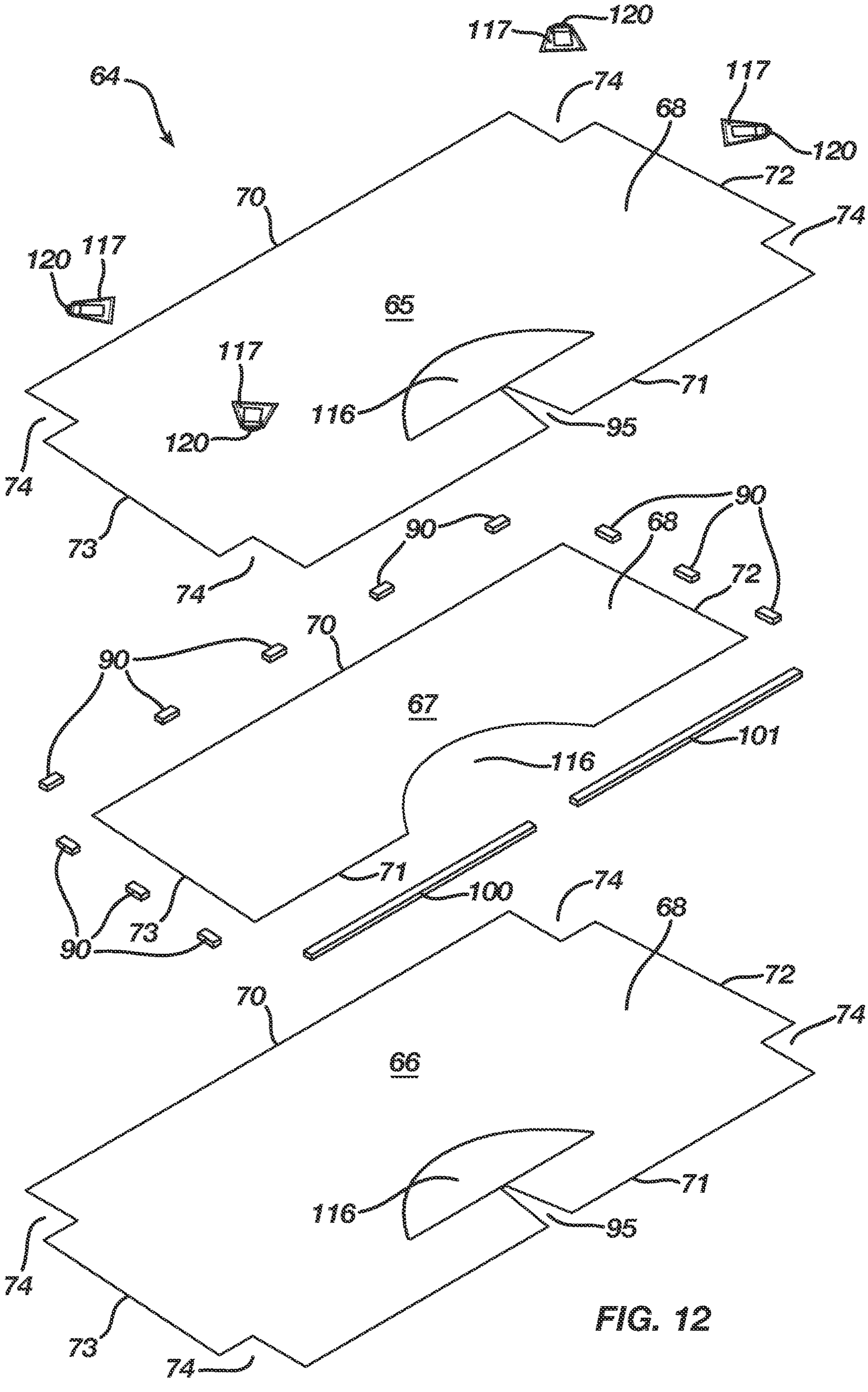
FIG. 12 is an exploded perspective view illustrating the cover for a transparent armament window of a vehicle according to the second embodiment.

As illustrated in FIG. 7, the cover 4 fits over to cover and thus protect a transparent armament window of a vehicle beginning by seating the cover front face 15 atop the transparent armament window with the upper, lower, right, and left sides 18, 19, 20, and 21 of the cover front face 15 adjacent or minimally over the upper, lower, right, and left edges of the transparent armament window. If the vehicle includes a platform, the screen 53 is lifted from the opening 51 to expose the opening 51 thereby allowing the cover 4 to bypass the platform and seat atop the transparent armament window. The screen 53 engages the vehicle via the magnet 30 therein to remain fastened out of the way. The upper, lower, right, and left flaps 22, 23, 24, and 25 pivot and thus fold respectively over the transparent armament window at the upper, lower, right, and left edges thereof until the upper, lower, right, and left flaps 22, 23, 24, and 25 at their upper, lower, right, and left pockets 26, 27, 28, and 29 respectively contacts the vehicle, whereby the magnets 30 engage the vehicle thereby holding and thus sealing the cover 4 over the transparent armament window. When a more secure affixation of the cover 4 over the transparent armament window is desired, a tie down 49 engaged with each of the anchor tabs 47 is fastened with the vehicle.

As illustrated in FIGS. 8-12, a cover 64 according to a second embodiment is configured to fit over and cover a transparent armament window of a vehicle, and, more particularly, but not by way of limitation, to fit over and cover both a driver side front transparent armament window and a passenger side front transparent armament window of the vehicle. The cover 64 according to the second embodiment includes a sheet of outer protective material 65, a sheet of protective backing material 66, and a sheet of insulating material 67 for insertion between the sheet of outer protective material 65 and the sheet of protective backing material 66. The outer protective material 65 and the protective backing material 66 in the second embodiment are a durable nylon material suitable for use outdoors, such as, for example, a textured nylon Codura® available from Seattle Textile Company, 3434 2$^{nd}$ Avenue South, Seattle, WA 98134 (seatex.com). The insulating material 67 in the second embodiment is a radiant barrier insulation selected to provide a radiant barrier that prevents thermal transmissions and thus repeated heating and cooling of the transparent armament window, such as, for example, a reflective single or double bubble foil/foil RFID radiant barrier insulation or a reflective single or double bubble polyethylene/foil RFID radiant barrier insulation available from Innovative Insulation Solutions, 6200 W. Pioneer Parkway, Arlington, TX 76013 (radiantbarrier.com).

The outer protective material 65, the protective backing material 66, and the insulating material 67 in the second embodiment are rectangular with a front surface 68, a rear surface 69, an upper side 70, a lower side 71, a right side 72, and a left side 73 although one of ordinary skill in the art will recognize the shape of the outer protective material 65, the protective backing material 66, and the insulating material 67 is determined by the shape of the transparent armament window or the perimeter encompassed by multiple transparent armament windows. The outer protective material 65 and the protective backing material 66 in the second embodiment are dimensionally greater than the transparent armament window or the perimeter encompassed by multiple transparent armament windows in order to allow the cover 64 to extend over the transparent armament window or windows. The outer protective material 65 in the second embodiment is dimensionally greater than the protective backing material 66 such that the outer protective material 65 facilitates closure and thus sealing of the cover 64 at the edges thereof. Alternatively, the outer protective material 65 and the protective backing material 66 may be dimensionally identical whereby a nylon material batting secured about the edges of the outer protective material 65 and the protective backing material 66 closes and thus seals the cover 64. The insulating material 67 in the second embodiment is dimensionally identical to the transparent armament window or the perimeter encompassed by multiple transparent armament windows or minimally greater dimensionally whereby the insulating material 67 seats entirely atop the transparent armament window or windows thereby substantially, completely blocking the transparent armament window or windows to thermal transmissions. The outer protective material 65 and the protective backing material 66 in the second embodiment at the top right corner, bottom right corner, top left corner, and bottom left corner include a cut-out section 74 that permits the cover 64 to fit around a window frame for the transparent armament window during seating of the cover 64 atop the transparent armament window. Nevertheless, one of ordinary skill in the art will recognize that the outer protective material 65 and the protective backing material 66 may comprise any number of cut-out sections 74 including none as determined by the window frame or frames for the transparent armament window or windows.

When forming the cover 64 from the outer protective material 65, the protective backing material 66, and the insulating material 67, the outer protective material 65 at its rear surface 69 is placed atop the protective backing material 66 at its front surface 68 with the insulating material 67 centered between the outer protective material 65 and the protective backing material 66. The outer protective material 65 secures with the protective backing material 66 directly adjacent the insulating material 67 in order to seal the insulating material 67 within the outer protective material 65 and the protective backing material 66. The outer protective material 65 secures with the protective backing material 66 using any suitable securing means, such as, for example, sewing or an adhesive. The securing of the outer protective material 65 and the protective backing material 66 about the insulating material 67 creates a cover front face 75 comprising a protective cover top 76 secured to a protective backing 77 with the insulating material 67 therebetween. The cover front face 75 includes an upper side 78, a lower side 79, a right side 80, and a left side 81. The cover front face 75, due to the sizing and shape of the insulating material 67, is configured to seat atop the transparent armament window or windows with the upper side 78 of the cover front face 75 adjacent or minimally over an upper edge or edges of the transparent armament window or windows, the lower side 79 of the cover front face 16 adjacent or minimally over a lower edge or edges of the transparent armament window or windows, the right side 80 of the cover front face 75 adjacent or minimally over a right edge or edges of the transparent armament window or windows, the left side 81 of the front face 75 adjacent or minimally over a left edge or edges of the transparent armament window or windows.

After creating the cover front face 75, the outer protective material 65 and the protective backing material 66 in the second embodiment being dimensionally greater than the insulating material 67 allows the formation of an upper flap 82, a lower flap 83, a right flap 84, and a left flap 85. Moreover, the outer protective material 65 in the second embodiment being dimensionally greater than the protective backing material 66 or the use of a nylon material batting allows the formation of an upper pocket 86 in the upper flap 82, a lower pocket 87 in the lower flap 83, a right pocket 88 in the right flap 84, and a left pocket 89 in the left flap 85.

Formation of the upper flap 82 and the upper pocket 86 includes at least one magnet 90 and preferably multiple magnets 90 being placed on the rear surface 69 of the protective backing material 66 adjacent its upper side 70. After placement of the magnets 90, the outer protective material 65 at its upper side 70 is folded over the protective backing material 66 at its upper side 70 until the outer protective material 65 at its upper side 70 overlays the magnets 90. The outer protective material 65 then secures with the protective backing material 66 using any suitable securing means, such as, for example, sewing or an adhesive. The securing of the outer protective material 65 with the protective backing material 66 seals the upper flap 82 and thus the cover 64 while further creating the upper pocket 86 including the magnets 90 therein. The outer protective material 65 additionally secures with the protective backing material 66 about each of the magnets 90 in order to affix the magnets 90 within the upper pocket 86. It should be understood by one of ordinary skill in the art that the upper flap 82 may be formed without insulating material 67 or alternatively insulating material 67 may be placed between the outer protective material 65 at its rear surface 69 and the protective backing material 66 at its front surface 69 including an appropriate securing of the outer protective material 65 with the protective backing material 66 that seals the insulating material 67 within the upper flap 82.

In the alternative, a nylon material batting fits over the outer protective material 65 and the protective backing material 66 at their upper sides 70 until the nylon material batting overlays the magnets 90. The securing of the nylon material batting to the outer protective material 65 and the protective backing material 66 seals the upper flap 82 and thus the cover 64 while further creating the upper pocket 86 including the magnets 90 therein. The nylon material batting additionally secures with the protective backing material 66 at its rear surface 69 about each of the magnets 90 in order to affix the magnets 90 within the upper pocket 86. The nylon material batting secures with the outer protective material 65 and the protective backing material 66 using any suitable securing means, such as, for example, sewing or an adhesive.

Upon creation of the upper flap 82, the upper flap 82 extends from the upper side 78 of the cover front face 75 to an edge 91 thereof while comprising a protective flap top 92 secured to a protective backing 93 including the upper pocket 86 at the protective backing 93 adjacent the edge 91. The upper flap 82 is configured, particularly with respect to a distance 94 the upper flap 82 extends from the cover front face 75, to pivot and thus fold relative to the upper side 78 of the cover front face 75 such that the upper flap 82 extends and if necessary folds over the transparent armament window or windows at the upper edge or edges thereof until the upper flap 82 at the upper pocket 86 thereof contacts the vehicle, such as, for example, at the window frame or frames for the transparent armament window or windows. The magnets 90, once the upper flap 82 at the upper pocket 86 contacts the vehicle, engage the vehicle thereby holding and thus sealing the cover 64 over the transparent armament window or windows. The magnets 90 in the second embodiment are any magnets suitable to engage a vehicle or vehicle window frame, such as, for example, ceramic ferrite magnets.

The lower flap 83 and the lower pocket 87 in the second embodiment includes a gap 95 that divides the lower flap 83 into a first flap section 96 and a second flap section 97 and the lower pocket 87 into a first lower pocket section 98 and a second lower pocket section 99. The first and second flap sections 96 and 97 and the first and second lower pocket sections 98 and 99 facilitate securing of the cover 64 over more than one transparent armament window. Nevertheless, one of ordinary skill in the art will recognize the lower flap

83 and the lower pocket 87 remain configured to allow placement of the cover 64 over one transparent armament window.

Formation of the lower flap 83 and the lower pocket 87 includes the first flap section 96 and the second flap section 97 respectively receiving first and second magnets 100 and 101 through placement of the first and second magnets 100 and 101 on the rear surface 69 of the protective backing material 66 adjacent its lower side 71. After placement of the first and second magnets 100 and 101, the outer protective material 65 at its lower side 71 is folded over the protective backing material 66 at its lower side 71 until the outer protective material 65 at its lower side 71 overlays the first and second magnets 100 and 101. The outer protective material 65 then secures with the protective backing material 66 using any suitable securing means, such as, for example, sewing or an adhesive. The securing of the outer protective material 65 with the protective backing material 66 seals the first and second flap sections 96 and 97 and thus the lower flap 83 and the cover 64 while further creating the first and second lower pocket sections 98 and 99 and thus the lower pocket 87 including respectively therein the first and second magnets 100 and 101. It should be understood by one of ordinary skill in the art that the first and second flap sections 96 and 97 and thus the lower flap 83 may be formed without insulating material 67 or alternatively insulating material 67 may be placed between the outer protective material 65 at its rear surface 69 and the protective backing material 66 at its front surface 69 including an appropriate securing of the outer protective material 65 with the protective backing material 66 that seals the insulating material 67 within the first and second flap sections 96 and 97 and thus the lower flap 83. The first and second magnets 100 and 101 in the second embodiment are any weighted magnets suitable to engage a vehicle or vehicle window frame, such as, for example, weighted ceramic ferrite magnets.

In the alternative, a nylon material batting fits over the outer protective material 65 and the protective backing material 66 at their lower sides 71 until the nylon material batting overlays the first and second magnets 100 and 101. The securing of the nylon material batting to the outer protective material 65 and the protective backing material 66 seals the first and second flap sections 96 and 97 and thus the lower flap 83 and the cover 64 while further creating the first and second lower pocket sections 98 and 99 and thus the lower pocket 87 including respectively therein the first and second magnets 100 and 101. The nylon material batting secures with the outer protective material 65 and the protective backing material 66 using any suitable securing means, such as, for example, sewing or an adhesive.

Upon creation of the lower flap 83, the lower flap 83 and thus the first and second flap sections 96 and 97 extend from the lower side 79 of the cover front face 75 to an edge 102 thereof while comprising a protective flap top 103 secured to a protective backing 104 including the lower pocket 87 and thus the first and second lower pocket sections 98 and 99 at the protective backing 104 adjacent the edge 102. The lower flap 83 and thus the first and second flap sections 96 and 97 are configured, particularly with respect to a distance 105 the lower flap 83 and thus the first and second flap sections 96 and 97 extend from the cover front face 75, to pivot and thus fold relative to the lower side 79 of the cover front face 75 such that the lower flap 83 and thus the first and second flap sections 96 and 97 extend and if necessary folds over the transparent armament window or windows at the lower edge or edges thereof until the lower flap 83 and thus the first and second flap sections 96 and 97 at the lower pocket 87 and thus the first and second lower pocket sections 98 and 99 thereof contact the vehicle, such as, for example, at the window frame or frames for the transparent armament window or windows. The first and second magnets 100 and 101, once the lower flap 83 and thus the first and second flap sections 96 and 97 at the lower pocket 87 and thus the first and second lower pocket sections 98 and 99 contact the vehicle, engage the vehicle thereby holding and thus sealing the cover 64 over the transparent armament window or windows.

Formation of the right flap 84 and the right pocket 88 includes at least one magnet 90 and preferably multiple magnets 90 being placed on the rear surface 69 of the protective backing material 66 adjacent its right side 72. After placement of the magnets 90, the outer protective material 65 at its right side 72 is folded over the protective backing material 66 at its right side 72 until the outer protective material 65 at its right side 72 overlays the magnets 90. The outer protective material 65 then secures with the protective backing material 66 using any suitable securing means, such as, for example, sewing or an adhesive. The securing of the outer protective material 65 with the protective backing material 66 seals the right flap 84 and thus the cover 64 while further creating the right pocket 88 including the magnets 90 therein. The outer protective material 65 additionally secures with the protective backing material 66 about each of the magnets 90 in order to affix the magnets 90 within the right pocket 88. It should be understood by one of ordinary skill in the art that the right flap 84 may be formed without insulating material 67 or alternatively insulating material 67 may be placed between the outer protective material 65 at its rear surface 69 and the protective backing material 66 at its front surface 69 including an appropriate securing of the outer protective material 65 with the protective backing material 66 that seals the insulating material 67 within the right flap 84.

In the alternative, a nylon material batting fits over the outer protective material 65 and the protective backing material 66 at their right sides 72 until the nylon material batting overlays the magnets 90. The securing of the nylon material batting to the outer protective material 65 and the protective backing material 66 seals the right flap 84 and thus the cover 64 while further creating the right pocket 88 including the magnets 90 therein. The nylon material batting additionally secures with the protective backing material 66 at its rear surface 69 about each of the magnets 90 in order to affix the magnets 90 within the right pocket 88. The nylon material batting secures with the outer protective material 65 and the protective backing material 66 using any suitable securing means, such as, for example, sewing or an adhesive.

Upon creation of the right flap 84, the right flap 84 extends from the right side 80 of the cover front face 75 to an edge 106 thereof while comprising a protective flap top 107 secured to a protective backing 108 including the right pocket 88 at the protective backing 108 adjacent the edge 106. The right flap 84 is configured, particularly with respect to a distance 109 the right flap 84 extends from the cover front face 75, to pivot and thus fold relative to the right side 80 of the cover front face 75 such that the right flap 84 extends and if necessary folds over the transparent armament window at the right edge thereof until the right flap 84 at the right pocket 88 thereof contacts the vehicle, such as, for example, at the window frame for the transparent armament window. The magnets 90, once the right flap 84 at the right pocket 88 contacts the vehicle, engage the vehicle thereby holding and thus sealing the cover 64 over the transparent armament window.

Formation of the left flap 85 and the left pocket 89 includes at least one magnet 90 and preferably multiple magnets 90 being placed on the rear surface 69 of the protective backing material 66 adjacent its left side 73. After placement of the magnets 90, the outer protective material 65 at its left side 73 is folded over the protective backing material 66 at its left side 73 until the outer protective material 65 at its left side 73 overlays the magnets 90. The outer protective material 65 then secures with the protective backing material 66 using any suitable securing means, such as, for example, sewing or an adhesive. The securing of the outer protective material 65 with the protective backing material 66 seals the left flap 85 and thus the cover 64 while further creating the left pocket 89 including the magnets 90 therein. The outer protective material 65 additionally secures with the protective backing material 66 about each of the magnets 90 in order to affix the magnets 90 within the left pocket 89. It should be understood by one of ordinary skill in the art that the left flap 85 may be formed without insulating material 67 or alternatively insulating material 67 may be placed between the outer protective material 65 at its rear surface 69 and the protective backing material 66 at its front surface 69 including an appropriate securing of the outer protective material 65 with the protective backing material 66 that seals the insulating material 67 within the left flap 85.

In the alternative, a nylon material batting fits over the outer protective material 65 and the protective backing material 66 at their left sides 73 until the nylon material batting overlays the magnets 90. The securing of the nylon material batting to the outer protective material 65 and the protective backing material 66 seals the left flap 85 and thus the cover 64 while further creating the left pocket 89 including the magnets 90 therein. The nylon material batting additionally secures with the protective backing material 66 at its rear surface 69 about each of the magnets 90 in order to affix the magnets 90 within the left pocket 89. The nylon material batting secures with the outer protective material 65 and the protective backing material 66 using any suitable securing means, such as, for example, sewing or an adhesive.

Upon creation of the left flap 85, the left flap 85 extends from the left side 81 of the cover front face 75 to an edge 110 thereof while comprising a protective flap top 111 secured to a protective backing 112 including the left pocket 89 at the protective backing 112 adjacent the edge 110. The left flap 85 is configured, particularly with respect to a distance 113 the left flap 85 extends from the cover front face 75, to pivot and thus fold relative to the left side 81 of the cover front face 75 such that the left flap 85 extends and if necessary folds over the transparent armament window at the left edge thereof until the left flap 85 at the left pocket 89 thereof contacts the vehicle, such as, for example, at the window frame for the transparent armament window. The magnets 90, once the left flap 85 at the left pocket 89 contacts the vehicle, engage the vehicle thereby holding and thus sealing the cover 64 over the transparent armament window.

In the second embodiment, the cover 64 in the cover front face 75 includes a guide 114 that marks a central axis 115 of the cover 64 in order to allow placement of the cover 64 over a driver side front transparent armament window and a passenger side front transparent armament window such that the insulating material 67 of the cover 64 is positioned over both transparent armament windows. Formation of the guide 114 includes providing each sheet of outer protective material 65, protective backing material 66, and insulating material 67 with an opening 116 located at a lower center of the outer protective material 65, protective backing material 66, and insulating material 67. After making the cover front face 75, a different color piece of the outer protective material 65 sized to the opening 116 is placed on the protective cover top 76 over the opening 116. Similarly, a different color piece of the protective backing material 66 sized to the opening 116 is placed on the protective backing 77 over the opening 116. The different color pieces of the outer protective material 65 and the protective backing material 66 then are secured respectively with the protective cover top 76 and the protective backing 77 using any suitable securing means, such as, for example, sewing or an adhesive. The guide 114 in the second embodiment is centrally located in the cover front face 75 adjacent its lower side 79 while further including dimensions that allow the guide 114 to span a gap between a driver side front transparent armament window and a passenger side front transparent armament window. In accordance therewith, placement of the cover 64 over the transparent armament windows with the guide 114 located therebetween ensures the insulating material 67 of the cover 64 seats atop both transparent armament windows. It should be understood by one of ordinary skill in the art that the guide 114 may be formed with insulating material 67 inserted between the different color pieces of the outer protective material 65 and the protective backing material 66 including an appropriate securing of the pieces of the outer protective material 65 and the protective backing material 66 that seals the insulating material 67 within the guide 114. Inclusion of insulating material 67 within the guide 114 allows use of the cover 64 not only with two transparent armament windows but also with a single larger transparent armament window. Although the guide 114 seals the opening 116 through the cover front face 75, one of ordinary skill in the art will recognize the guide 114 may be placed on a cover front face 75 without an opening 116.

The engagement of the upper, right, and left flaps 82, 24, and 85 via the magnets 90 and the lower flap 83 via the first and second magnets 100 and 101 with the window frame or frames or the vehicle secures the cover 64 over the transparent armament window or windows while allowing a quick removal of the cover 64 from the transparent armament window or windows in the event the vehicle must be quickly relocated. Nevertheless, in instances of vehicle transport, long term vehicle storage, or simply a high wind situation, it is desirable to affix the cover 64 more firmly with the vehicle. In accordance therewith, the cover 64 includes an anchor tab 117 secured with the cover front face 75 at the corners 118 thereof and more particularly with the protective cover top 76 of the cover front face 75. The anchor tabs 117 secure with the cover front face 75 at the corners 118 using any suitable securing means, such as, for example, sewing or an adhesive. The anchor tabs 117 in the second embodiment are configured to engage with a tie down 119 securable with the window frame or the vehicle, such as, for example, the illustrated strap type tie downs with end hooks. More particularly, the anchor tabs 117 in the second embodiment are each provided with an aperture 120 formed by an anchor ring incorporated into the anchor tab 117 that is engageable with a tie down 119. Once the cover 64 is secured with the window frame or the vehicle using the anchor tabs 117 and the tie downs 119, the cover 64 will remain affixed over the transparent armament window during vehicle transport, long term vehicle storage, a high wind situation, and the like.

Figure 13:
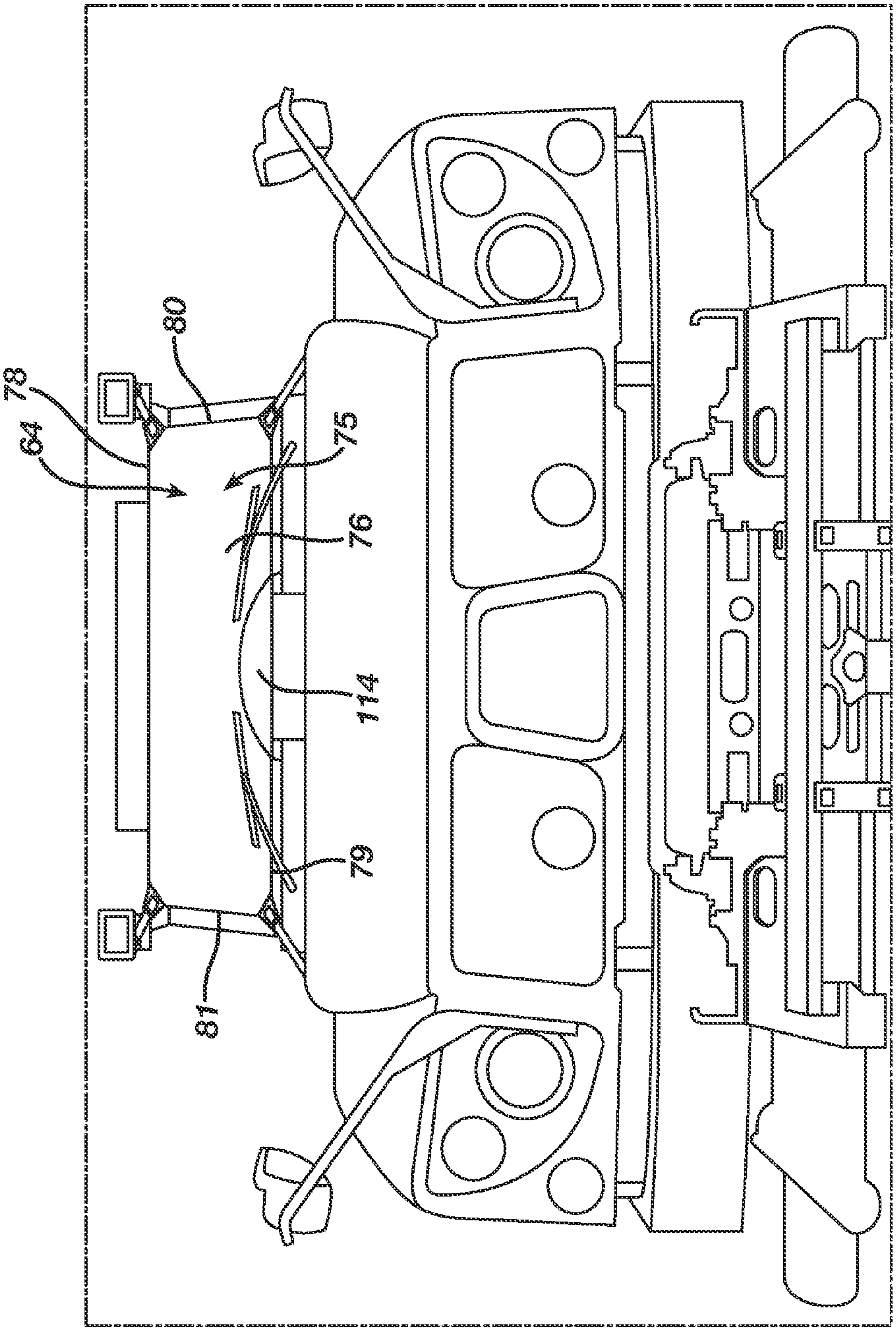
FIG. 13 is a front perspective view illustrating the cover according to the second embodiment placed atop a transparent armament window of a vehicle.

As illustrated in FIG. 13, the cover 64 fits over to cover and thus protect a transparent armament window of a vehicle beginning by seating the cover front face 75 atop the transparent armament window with the upper, lower, right, and left sides 78, 79, 80, and 81 of the cover front face 75 adjacent or minimally over the upper, lower, right, and left edges of the transparent armament window. The upper, lower, right, and left flaps 82, 83, 84, and 85 pivot and thus fold respectively over the transparent armament window at the upper, lower, right, and left edges thereof until the upper, lower, right, and left flaps 82, 83, 84, and 85 at their upper, lower, right, and left pockets 86, 87, 88, and 89 respectively contacts the vehicle, whereby the magnets 90 engage the vehicle thereby holding and thus sealing the cover 64 over the transparent armament window. When a more secure affixation of the cover 64 over the transparent armament window is desired, a tie down 119 engaged with each of the anchor tabs 117 is fastened with the vehicle.

When the vehicle includes a driver side front transparent armament window and a passenger side front transparent armament window, the cover 64 fits over to cover and thus protect the transparent armament windows beginning by locating the guide 114 at the gap between the transparent armament windows at the lower edges thereof. The cover front face 75 then seats atop the transparent armament windows with the upper and the lower sides 78 and 79 of the cover front face 75 adjacent or minimally over the upper and lower edges of the transparent armament windows, the right side 80 of the cover front face 75 adjacent or minimally over the right edge of the driver side transparent armament window, and the left side 81 of the cover front face 75 adjacent or minimally over the left edge of the passenger side transparent armament window such that the insulating material 67 of the cover 64 is positioned over both transparent armament windows. The upper flap 82 pivots and thus folds over the transparent armament windows at the upper edges thereof until the upper flap 82 at its upper pocket 86 contacts the vehicle, whereby the magnets 90 engage the vehicle thereby holding and thus sealing the cover 64 over the transparent armament windows. The lower flap 83 and in particular the first and second flap sections 96 and 97 pivot and thus fold respectively over the driver side transparent armament window and the passenger side transparent armament window at the lower edges thereof until the first and second flap sections 96 and 97 at their first and second lower pocket sections 98 and 99 respectively contacts the vehicle, whereby the first and second magnets 100 and 101 engage the vehicle thereby holding and thus sealing the cover 64 over the transparent armament windows. The right flap 84 pivots and thus folds respectively over the driver side transparent armament window at the right edge thereof until the right flap 84 at its right pocket 88 contacts the vehicle, whereby the magnets 90 engage the vehicle thereby holding and thus sealing the cover 64 over the transparent armament windows. The left flap 85 pivots and thus folds respectively over the passenger side transparent armament window at the left edge thereof until the left flap 85 at its left pocket 89 contacts the vehicle, whereby the magnets 90 engage the vehicle thereby holding and thus sealing the cover 64 over the transparent armament windows. When a more secure affixation of the cover 64 over the transparent armament window is desired, a tie down 119 engaged with each of the anchor tabs 117 is fastened with the vehicle.

The covers 4 or 64 for a transparent armament window or windows of a vehicle provide both maintenance as well as tactical advantages to operators of such vehicles. The covers 4 or 64 block the transparent armament window or windows from direct sunlight and the resulting degrading delamination, bubbles, loss of adhesion, clouding, and/or discoloring caused by the sunlight, UV rays, and repeated heating and cooling. In particular, the outer protective materials 5 or 65 respectively of the covers 4 or 64 block the direct sunlight whereas the insulating materials 7 or 67 respectively of the covers 4 or 64 block UV rays while further furnishing a thermal barrier that prevents repeated heating and cooling of the transparent armament window. Moreover, the covers 4 or 64 in general and the insulating materials 7 or 67 thereof in particular, due to the padding provided by the insulating material 7 or 67, protect the transparent armament window from strikes and abrasions caused by natural materials, such as, hail, rocks, sand, and the like, experienced during vehicle transport and storage or extended use in a fixed operating position.

A vehicle including transparent armament windows often is deployed in a fixed operating position for extended periods of time. Visible light glare and reflections from the transparent armament windows, visible light signatures from inside the vehicle, and/or thermal signatures from inside the vehicle, especially from the vehicle operators, present safety challenges to a deployed vehicle. Such visible light glare and reflections and/or visible light and/or thermal signatures, particularly at night, detrimentally enhance the visibility of the vehicle. The covers 4 or 64 prevent visible light glare and reflections from the transparent armament window or windows and visible light transmissions from inside the vehicle thereby impeding viewing into the interior of the vehicle from exterior of the vehicle by blocking the transparent armament window or windows. In particular, the covers 4 or 64 seat atop the transparent armament window or windows with the upper, lower, right, and left flaps 22, 23, 24, and 25 or 82, 83, 84, and 85 respectively folded over the transparent armament window or windows such that visible light does not reflect from the transparent armament window or windows or escape from interior of the vehicle. The covers 4 or 64 prevent thermal transmissions from inside the vehicle thereby impeding viewing into the interior of the vehicle from exterior of the vehicle using a thermal imaging device by including a radiant barrier in the form of insulating materials 7 or 67 respectively that prevents thermal signatures from exiting the transparent armament window or windows. In particular, the covers 4 or 64 seat atop the transparent armament window or windows with the insulating materials 7 or 67 respectively over the transparent armament window or windows and the upper, lower, right, and left flaps 22, 23, 24, and 25 or 82, 83, 84, and 85 respectively folded over the transparent armament window or windows such that thermal signatures do not escape from interior of the vehicle. When a vehicle is deployed in a fixed operating position, the tie downs 49 or 119 are not employed with the covers 4 or 64 being held in place using the magnets 30 or the magnets 90 and the first and second magnets 100 and 101 in order to allow a quick removal of the covers 4 or 64 from the transparent armament window or windows in the event the vehicle must be quickly relocated.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description; rather, it is defined only by the claims that follow.

The invention claimed is:

1. A cover for a transparent armament window of a vehicle, said transparent armament window comprising a peripheral frame extending outward from said vehicle and framing said transparent armament, said cover comprising:

a cover front face comprising a protective cover top secured to a protective backing with insulating material therebetween, the cover front face including an upper side, a lower side, a right side, and a left side, the cover front face being configured to seat atop the transparent armament window of the vehicle with the upper side of the cover front face adjacent an upper edge of the transparent armament window, the lower side of the cover front face adjacent a lower edge of the transparent armament window, the right side of the cover front face adjacent a right edge of the transparent armament window, the left side of the front face adjacent a left edge of the transparent armament window;

an upper flap comprising a protective upper flap top secured to a protective upper flap backing, the upper flap extending from the upper side of the cover front face, the upper flap being configured to pivot relative to the upper side of the cover front face whereby the upper flap folds over the transparent armament window at the upper edge thereof, the upper flap comprising a series of upper flap magnets configured to secure said upper flap to said peripheral frame when said upper flap is folded over the transparent armament window;

a right flap comprising a protective right flap top secured to a protective right flap backing, the right flap extending from the right side of the cover front face, the right flap being configured to pivot relative to the right side of the cover front face whereby the right flap folds over the transparent armament window at the right edge thereof, the right flap comprising a series of right flap magnets configured to secure said right flap to said peripheral frame when said right flap is folded over the transparent armament window;

a left flap comprising a protective left flap top secured to a protective left flap backing, the left flap extending from the left side of the cover front face, the left flap being configured to pivot relative to the left side of the cover front face whereby the left flap configured to fold over the transparent armament window at the left edge thereof, the left flap comprising a series of left flap magnets configured to secure said left flap to said peripheral frame when said left flap is folded over the transparent armament window;

wherein said right flap, upper flap, and left flap are configured to pivot relative to said cover body so as to provide sealing engagement on said peripheral frame of said transparent armament window to prevent light from passing through said transparent armament window; and wherein the cover front face includes an opening therethrough configured to allow the cover to fit over a platform extending from the vehicle in a location that places the platform over the transparent armament window.

2. The cover for a transparent armament window of a vehicle of claim 1, comprising a screen secured to the cover adjacent the opening whereby the screen is sized to seat over and close the opening.

3. The cover for a transparent armament window of a vehicle of claim 2, further comprising a first magnet positioned in the screen and configured such that when the screen is lifted from the opening, maintains the screen lifted from the opening through contact with the vehicle; and a second magnet located within the cover front face in alignment with the magnet of the screen and configured such that when the screen is closed over the opening works with the magnet of the screen to maintain the screen closed over the opening.

4. The cover for a transparent armament window of a vehicle of claim 2, wherein the screen includes therein an insulating material.

5. A cover for a transparent armament window of a vehicle, said transparent armament window comprising a peripheral frame extending outward from said vehicle and framing said transparent armament, said cover comprising:

a cover front face comprising a protective cover top secured to a protective backing with insulating material therebetween, the cover front face including an upper side, a lower side, a right side, and a left side, the cover front face being configured to seat atop the transparent armament window of the vehicle with the upper side of the cover front face adjacent an upper edge of the transparent armament window, the lower side of the cover front face adjacent a lower edge of the transparent armament window, the right side of the cover front face adjacent a right edge of the transparent armament window, the left side of the front face adjacent a left edge of the transparent armament window;

an upper flap comprising a protective upper flap top secured to a protective upper flap backing, the upper flap extending from the upper side of the cover front face, the upper flap being configured to pivot relative to the upper side of the cover front face whereby the upper flap folds over the transparent armament window at the upper edge thereof, the upper flap comprising a series of upper flap magnets configured to secure said upper flap to said peripheral frame when said upper flap is folded over the transparent armament window;

a right flap comprising a protective right flap top secured to a protective right flap backing, the right flap extending from the right side of the cover front face, the right flap being configured to pivot relative to the right side of the cover front face whereby the right flap folds over the transparent armament window at the right edge thereof, the right flap comprising a series of right flap magnets configured to secure said right flap to said peripheral frame when said right flap is folded over the transparent armament window;

a left flap comprising a protective left flap top secured to a protective left flap backing, the left flap extending from the left side of the cover front face, the left flap being configured to pivot relative to the left side of the cover front face whereby the left flap configured to fold over the transparent armament window at the left edge thereof, the left flap comprising a series of left flap magnets configured to secure said left flap to said peripheral frame when said left flap is folded over the transparent armament window;

wherein said right flap, upper flap, and left flap are configured to pivot relative to said cover body so as to provide sealing engagement on said peripheral frame of said transparent armament window to prevent light from passing through said transparent armament window; and wherein the transparent armament window comprising a first transparent armament window and a second transparent armament window adjacent to said first transparent armament window, wherein said peripheral frame comprises a first transparent armament window peripheral frame and a second transparent armament window peripheral frame, wherein:

the upper flap folds over the first transparent window metal frame and second transparent armament window metal frame at upper edges thereof whereby the upper flap extends over the upper edges of the first and second transparent armament windows and secures to each respective metal frame;

the right flap folds over the first transparent armament window at a right edge thereof whereby the right flap extends over the right edge of the first transparent armament window and secures to the first transparent window metal frame; and the left flap folds over the second transparent armament window at a left edge thereof whereby the left flap extends over the left edge of the second transparent armament window and secures to the second transparent window metal frame.

6. The cover for a transparent armament window of a vehicle of claim 5, comprising a guide centrally located in the cover front face adjacent the lower side thereof, the guide including dimensions whereby the guide is configured for positioning in a gap between the first transparent armament window and the second transparent armament window such that placement of the cover atop the first and second transparent armament windows with the guide therebetween ensures the insulating material of the cover seats atop both the first and second transparent armament windows.

7. The cover for a transparent armament window of a vehicle of claim 5, comprising a guide centrally located in the cover front face adjacent the lower side thereof, the guide including dimensions whereby the guide spans a gap between a first transparent armament window and an adjacent second transparent armament window such that placement of the cover atop the first and second transparent armament windows with the guide therebetween ensures the insulating material of the cover seats atop both the first and second transparent armament windows.

8. The cover for a first transparent armament window of a vehicle of claim 5, wherein:

the cover comprising a lower flap configured to extend beyond a lower edge of said peripheral frame of said transparent armament window, wherein a gap divides the lower flap into a first flap section and a second flap section;

the first lower flap section being configured to pivot relative to the lower side of the cover front face whereby the first lower flap section folds over the first transparent armament window at the lower edge thereof, and the first lower flap section being configured to receive therein the first weighted magnet that secures the first lower flap section to the vehicle when the first lower flap section extends over the lower edge of the first transparent armament window thereby covering the first transparent armament window at the lower edge; and the second lower flap section being configured to pivot relative to the lower side of the cover front face whereby the second lower flap section folds over the second transparent armament window at the lower edge thereof, and the second lower flap section being configured to receive therein the second weighted magnet that secures the second lower flap section to the vehicle when the second lower flap section extends over the lower edge of the second transparent armament window thereby covering the second transparent armament window at the lower edge.

9. The cover for a first transparent armament window and a second transparent armament window of a vehicle of claim 8, comprising:

a first lower pocket section formed in the first lower flap section, the first lower pocket section being configured to receive therein the first weighted magnet that secures the first lower flap section to the vehicle when the first lower flap section extends over the lower edge of the first transparent armament window; and a second lower pocket section formed in the second lower flap section, the second lower pocket section being configured to receive therein the second weighted magnet that secures the second lower flap section to the vehicle when the second lower flap section extends over the lower edge of the second transparent armament window.

10. A cover for a transparent armament window of a vehicle, said transparent armament window comprising a peripheral frame extending outward from said vehicle and framing said transparent armament, said cover comprising:

a cover front face comprising a protective cover top secured to a protective backing with insulating material therebetween, the cover front face including an upper side, a lower side, a right side, and a left side, the cover front face being configured to seat atop the transparent armament window of the vehicle with the upper side of the cover front face adjacent an upper edge of the transparent armament window, the lower side of the cover front face adjacent a lower edge of the transparent armament window, the right side of the cover front face adjacent a right edge of the transparent armament window, the left side of the front face adjacent a left edge of the transparent armament window;

an upper flap comprising a protective upper flap top secured to a protective upper flap backing, the upper flap extending from the upper side of the cover front face, the upper flap being configured to pivot relative to the upper side of the cover front face whereby the upper flap folds over the transparent armament window at the upper edge thereof, the upper flap comprising a series of upper flap magnets configured to secure said upper flap to said peripheral frame when said upper flap is folded over the transparent armament window;

a right flap comprising a protective right flap top secured to a protective right flap backing, the right flap extending from the right side of the cover front face, the right flap being configured to pivot relative to the right side of the cover front face whereby the right flap folds over the transparent armament window at the right edge thereof, the right flap comprising a series of right flap magnets configured to secure said right flap to said peripheral frame when said right flap is folded over the transparent armament window;

a left flap comprising a protective left flap top secured to a protective left flap backing, the left flap extending from the left side of the cover front face, the left flap being configured to pivot relative to the left side of the cover front face whereby the left flap configured to fold over the transparent armament window at the left edge thereof, the left flap comprising a series of left flap magnets configured to secure said left flap to said peripheral frame when said left flap is folded over the transparent armament window;

wherein said right flap, upper flap, and left flap are configured to pivot relative to said cover body so as to provide sealing engagement on said peripheral frame of said transparent armament window to prevent light from passing through said transparent armament window;

an outer protective material dimensionally greater than the transparent armament window;

a protective backing material dimensionally greater than the transparent armament window; and wherein said insulating material is inserted centrally between the outer protective material and the protective backing material, the insulating material being dimensionally similar to the transparent armament window such that insulating material is configured to seat atop the transparent armament window whereby the insulating material blocks the transparent armament window to thermal transmissions, wherein said insulating material does not extend beyond said cover front face to said upper flap, said right flap, or said left flap.

11. The cover for a transparent armament window of a vehicle of claim 10, further comprising a plurality of anchor tabs attached to said cover front face and configured for securing said cover front face to said vehicle by a series of tie downs.

12. The cover for a transparent armament window of a vehicle of claim 10, further comprising:

an upper pocket formed in the upper flap, the upper pocket being configured to receive therein at least one of said series of upper flap magnets that secures the upper flap to the vehicle when the upper flap extends over the upper edge of the transparent armament window;

a right pocket formed in the right flap, the right pocket being configured to receive therein at least one of said series of right flap magnets that secures the right flap to the vehicle when the right flap extends over the right edge of the transparent armament window; and a left pocket formed in the left flap, the left pocket being configured to receive therein at least one of said series of left flap magnets that secures the left flap to the vehicle when the left flap extends over the left edge of the transparent armament window.

13. The cover for a transparent armament window of a vehicle of claim 10, the insulating material comprising a radiant barrier configured to block thermal signatures from interior of the vehicle thereby preventing viewing into the interior of the vehicle from exterior of the vehicle using a thermal imaging device.

14. The cover for a transparent armament window of a vehicle of claim 10, wherein said cover comprises a lower flap configured to extend over a lower edge of said peripheral frame of said transparent armament window.

15. The cover for a transparent armament window of a vehicle of claim 10, wherein the insulating material within the cover front face is configured to provide padding that protects the transparent armament window from strikes and abrasions caused by natural materials.

16. The cover for a transparent armament window of a vehicle of claim 10, comprising a lower flap comprising a protective flap top secured to a protective backing therebetween, the lower flap extending from the lower side of the cover front face, the lower flap being configured to pivot relative to the lower side of the cover front face whereby the lower flap folds over the transparent armament window at the lower edge thereof, and the lower flap being configured to secure to the vehicle when the lower flap extends over the lower edge of the transparent armament window thereby covering the transparent armament window at the lower edge.

17. The cover for a transparent armament window of a vehicle of claim 10 wherein said cover further comprising a lower flap, said lower flap comprising a weight configured to retain said lower flap on a hood of said vehicle.

18. The cover for a transparent armament window of a vehicle of claim 17 wherein said weight is magnetic.

19. The cover for a transparent armament window of a vehicle of claim 11 wherein said cover front face comprises at least four corners, wherein one anchor tab of said plurality of anchor tabs is positioned at each of said corners of said at least four corners of said cover front face.

20. A cover for a transparent armament window of a vehicle, the transparent armament window having a peripheral metal frame, the cover comprising:

a cover body sized and configured to overlie the transparent armament window, the cover body including an outer protective layer, a backing layer, and an insulating layer disposed between the outer protective layer and the backing layer;

a plurality of flaps extending from a perimeter of the cover body, the plurality of flaps including a top flap, a bottom flap, a left flap, and a right flap, wherein said plurality of flaps is each an extension of said outer protective layer of said cover body but free of said insulating layer;

wherein the top flap, the left flap, and the right flap are pivotally connected to the cover body and configured to pivot from a first position extending outward from the cover body to a second position folded over corresponding edges of the transparent armament window and adjacent portions of the metal frame;

one or more magnets disposed in each of the top flap and in the left and right flaps, the one or more magnets including at least a first magnet positioned in a left portion of the top flap and a second magnet positioned in a right portion of the top flap;

wherein the one or more magnets are configured to magnetically engage the peripheral frame after the top flap and the left and right flaps are folded over the corresponding edges to draw the top flap and the left and right flaps into conforming contact with the metal frame along the edges of the transparent armament window so as to establish a peripheral sealing engagement that inhibits transmission of light and ultraviolet radiation between an interior of the vehicle and an exterior of the vehicle.

21. The cover of claim 20, wherein the bottom flap is pivotally connected to the cover body and configured to fold over a lower edge of the transparent armament window.

22. The cover of claim 20, further comprising a plurality of anchor tabs secured to the cover body at spaced locations, each anchor tab including a coupling feature configured to engage a corresponding tie-down member secured to the vehicle.

23. The cover of claim 22, wherein the anchor tabs are positioned at corner regions of the cover body.

24. The cover of claim 22, wherein each anchor tab includes a grommet defining an aperture configured to receive a hook of the tie-down member.

25. The cover of claim 20, wherein the magnets are disposed within internal pockets formed within the top flap and the left and right flaps.

26. The cover of claim 20, wherein the insulating layer comprises a radiant barrier material configured to reduce thermal transmission through the transparent armament window.

27. The cover of claim 20, wherein the top flap and the left and right flaps collectively extend around a perimeter of the cover body to establish the peripheral sealing engagement along corresponding edges of the transparent armament window.

28. The cover of claim 20 wherein said plurality of flaps is each an extension of said outer protective layer of said cover body but free of said insulating layer such that said insulating layer ends at an edge of said cover body.

29. A cover for a transparent armament window of a vehicle, the transparent armament window being positioned within a peripheral frame of the vehicle, the cover comprising:

a cover body comprising:

an outer protective material;

a protective backing material secured to the outer protective material; and an insulating material positioned between the outer protective material and the protective backing material, the insulating material defining a central insulated region configured to overlie the transparent armament window;

wherein the insulating material terminates inwardly of a perimeter of the outer protective material and the protective backing material;

an upper flap extending from an upper side of the cover body, the upper flap being formed from an extension of the outer protective material and the protective backing material beyond the insulating material;

a lower flap extending from a lower side of the cover body, the lower flap being formed from an extension of the outer protective material and the protective backing material beyond the insulating material;

a first side flap extending from a first side of the cover body, the first side flap being formed from an extension of the outer protective material and the protective backing material beyond the insulating material; and a second side flap extending from a second side of the cover body, the second side flap being formed from an extension of the outer protective material and the protective backing material beyond the insulating material;

at least one magnet disposed within each of the upper flap, the lower flap, the first side flap, and the second side flap;

wherein the cover body is configured to seat against the transparent armament window with the insulating material positioned over the transparent armament window;

wherein the upper flap, the lower flap, the first side flap, and the second side flap are configured to fold over respective peripheral edges of the transparent armament window and engage portions of the vehicle surrounding the transparent armament window through magnetic attraction generated by the at least one magnet; and wherein engagement of the upper flap, the lower flap, the first side flap, and the second side flap with the vehicle establishes a substantially continuous light-blocking seal around the transparent armament window that inhibits transmission of visible light between an interior of the vehicle and an exterior of the vehicle around peripheral edges of the transparent armament window.

30. The cover of claim 29, wherein the insulating material is substantially coextensive with the transparent armament window.

31. The cover of claim 29, wherein the insulating material terminates adjacent each side of the cover body such that the upper flap, lower flap, first side flap, and second side flap are substantially free of the insulating material.

32. The cover of claim 29, wherein each flap includes a pocket containing at least one magnet.

33. The cover of claim 32, wherein each pocket is positioned adjacent an outer edge of a respective flap.

34. The cover of claim 29, wherein each flap is pivotable relative to the cover body between a deployed position and a folded position.

35. The cover of claim 29, wherein the magnets are configured to engage a metallic frame surrounding the transparent armament window.

36. The cover of claim 29, wherein the cover body blocks thermal transmission through the transparent armament window and the flaps block light transmission around peripheral edges of the transparent armament window.

37. The cover of claim 29, wherein the insulating material comprises a radiant barrier insulation.

38. The cover of claim 29, further comprising anchor tabs positioned at corners of the cover body and configured for attachment to tie-down members.

39. The cover of claim 38, wherein the anchor tabs include apertures configured to receive the tie-down members.

40. The cover of claim 29, wherein the outer protective material and the protective backing material are sewn together adjacent a perimeter of the insulating material to define the cover body.

41. A cover for a transparent armament window of a vehicle, comprising:

a cover front face configured to overlie the transparent armament window and comprising:

an outer layer;

a backing layer secured to the outer layer; and an insulating insert positioned between the outer layer and the backing layer, the insulating insert defining a central insulated region sized to substantially cover the transparent armament window;

a plurality of peripheral flap portions extending outwardly from the central insulated region, the peripheral flap portions being formed from extensions of the outer layer and the backing layer beyond a perimeter of the insulating insert;

a plurality of magnets carried by the peripheral flap portions;

wherein the insulating insert terminates inwardly of the peripheral flap portions such that the peripheral flap portions define a peripheral sealing region surrounding the central insulated region;

wherein the peripheral flap portions are configured to fold over peripheral edges of the transparent armament window and engage portions of the vehicle surrounding the transparent armament window through magnetic attraction generated by the plurality of magnets; and wherein magnetic engagement of the peripheral flap portions with the vehicle causes the peripheral sealing region to conform against the vehicle and establish a substantially continuous light-blocking seal around the transparent armament window that inhibits transmission of visible light between an interior of the vehicle and an exterior of the vehicle around peripheral edges of the transparent armament window.

42. The cover of claim 41, wherein the peripheral flap portions comprise an upper flap, a lower flap, a first side flap, and a second side flap extending from respective sides of the central insulated region.

43. The cover of claim 41, wherein the peripheral sealing region is substantially free of the insulating insert.

44. The cover of claim 41, wherein the peripheral flap portions are formed from continuous portions of the outer layer and the backing layer extending beyond the perimeter of the insulating insert.

45. The cover of claim 41, wherein each peripheral flap portion includes a pocket containing at least one of the plurality of magnets.

46. The cover of claim 45, wherein the at least one magnet is positioned adjacent an outer edge of the respective peripheral flap portion.

47. The cover of claim 41, wherein the plurality of magnets are configured to magnetically engage a metallic frame surrounding the transparent armament window.

48. The cover of claim 41, wherein the peripheral flap portions extend beyond peripheral edges of the transparent armament window and overlap portions of the vehicle adjacent the transparent armament window.

49. The cover of claim 41, wherein magnetic attraction between the plurality of magnets and the vehicle compresses the peripheral sealing region against the vehicle to reduce light leakage around the transparent armament window.

50. The cover of claim 41, wherein the central insulated region is configured to reduce thermal transmission through the transparent armament window while the peripheral sealing region is configured to inhibit light transmission around peripheral edges of the transparent armament window.

51. The cover of claim 41, wherein the insulating insert comprises a radiant barrier insulation configured to reduce thermal signatures transmitted through the transparent armament window.

52. The cover of claim 41, wherein the peripheral flap portions are configured to block visible light signatures emitted from an interior of the vehicle.

53. The cover of claim 41, wherein the peripheral flap portions are configured to block ambient light from entering the vehicle around the transparent armament window.

54. The cover of claim 41, further comprising anchor tabs secured to the cover front face and configured for attachment to tie-down members that secure the cover to the vehicle.

55. The cover of claim 54, wherein the anchor tabs are positioned adjacent corners of the cover front face.

56. The cover of claim 54, wherein each anchor tab includes an aperture configured to receive a tie-down member.

57. The cover of claim 41, wherein the insulating insert is substantially coextensive with an area of the transparent armament window.

58. The cover of claim 41, wherein the cover front face is configured to substantially block thermal transmission through the transparent armament window while the peripheral sealing region substantially blocks light transmission around a perimeter of the transparent armament window.

* * * * *